United States Patent
Bali et al.

(10) Patent No.: US 8,176,251 B2
(45) Date of Patent: *May 8, 2012

(54) DYNAMIC OPTIMIZATION OF CACHE MEMORY

(75) Inventors: Naveen Bali, Cary, NC (US); Naresh Patel, San Jose, CA (US); Yasuhiro Endo, San Jose, CA (US)

(73) Assignee: Network Appliance, Inc., Sunnyvale, CA (US)

(*) Notice: Subject to any disclaimer, the term of this patent is extended or adjusted under 35 U.S.C. 154(b) by 937 days.

This patent is subject to a terminal disclaimer.

(21) Appl. No.: 12/186,507

(22) Filed: Aug. 5, 2008

(65) Prior Publication Data

US 2008/0294846 A1    Nov. 27, 2008

Related U.S. Application Data

(63) Continuation of application No. 11/213,165, filed on Aug. 26, 2005, now Pat. No. 7,424,577.

(51) Int. Cl.
   *G06F 12/00* (2006.01)
   *G06F 13/00* (2006.01)
(52) U.S. Cl. ......... 711/118; 711/133; 711/134; 711/154
(58) Field of Classification Search ............... 711/100, 711/122, 133–137, 144–145, 154, 118–119
   See application file for complete search history.

(56) References Cited

U.S. PATENT DOCUMENTS

| | | | | |
|---|---|---|---|---|
| 5,553,276 A * | 9/1996 | Dean | | 713/500 |
| 5,764,946 A * | 6/1998 | Tran et al. | | 712/239 |
| 5,887,152 A * | 3/1999 | Tran | | 712/217 |
| 5,944,815 A | 8/1999 | Witt | | |
| 6,075,938 A * | 6/2000 | Bugnion et al. | | 703/27 |
| 6,119,205 A * | 9/2000 | Wicki et al. | | 711/143 |
| 6,189,068 B1 * | 2/2001 | Witt et al. | | 711/3 |
| 2005/0138289 A1 | 6/2005 | Royer et al. | | |

OTHER PUBLICATIONS

Carr et al., "WSClock—A Simple and Effective Algorithm for Virtual Memory Management," Proc. Eigth Sump. Operating System Principles, 1981, pp. 87-95.

Denning et al., "Working Sets Past and Present," IEEE Transactions on Software Engineering, vol. SE-6, No. 1, Jan. 1980, pp. 64-85.

Jiang et al., "LIRS: An Efficient Low Inter-Reference Recency Set Replacement Policy to Improve Buffer Cache Performance," Proc. ACM Sigmetrics Conf., 2002, 12 pgs.

Johnson et al., "2Q: A Low Overhead High Performance Buffer Management Replacement Algorithm," Proceedings of the 20th VLDB Conf., 1994, pp. 439-450.

(Continued)

*Primary Examiner* — Tuan V. Thai

(74) *Attorney, Agent, or Firm* — Blakely, Sokoloff, Taylor & Zafman LLP.

(57) ABSTRACT

The present invention includes dynamically analyzing look-up requests from a cache look-up algorithm to look-up data block tags corresponding to blocks of data previously inserted into a cache memory, to determine a cache related parameter. After analysis of a specific look-up request, a block of data corresponding to the tag looked up by the look-up request may be accessed from the cache memory or from a mass storage device.

20 Claims, 7 Drawing Sheets

OTHER PUBLICATIONS

Lee et al., "LRFU: A Spectrum of Policies that Subsumes the Least Recently Used and Least Frequently Used Policies," IEEE Transactions on Computers, vol. 50, No. 12, Dec. 2001, pp. 1352-1361.

Megiddo et al., "ARC: A Self-Tuning, Low Overhead Replacement Cache," USENIX File & Storage Technologies Conference (FAST), Mar. 31, 2003, 16 pgs.

O'Neil et al., "The LRU-K Replacement Algorithm for Database Disk Buffering," Proc. 1993 ACL Sigmod International Conference on Management of Data, May 1993, pp. 297-306.

Zhou et al., "The Multi-Queue Replacement Algorithm for Second Level Buffer Caches," Proceedings of the 2001 USENIX Annual Technical Conference, Jun. 2001, 15 pgs.

* cited by examiner

DYNAMIC OPTIMIZATION OF CACHE MEMORY

RELATED APPLICATIONS

This application is a continuation of U.S. patent application Ser. No. 11/213,165, filed on Aug. 26, 2005 now U.S. Pat. No. 7,424,577, entitled "DYNAMIC OPTIMIZATION OF CACHE MEMORY," assigned to the corporate assignee of the present invention.

BACKGROUND

1. FIELD

At least one embodiment of the present invention pertains to dynamically analyzing cache memory use and dynamically updating cache memory related parameters.

2. BACKGROUND

Electrically operated machines, such as general-purpose and special-purpose computing devices (e.g., "computers"), data storage devices or systems, network servers, file servers, and Internet servers typically include computer processors and other devices (often operating under the control of a processor) that frequently need to store information in, or retrieve information from a computer memory.

For example, a data storage device, such as a network server, file server, or Internet server to store data for access by other entities, such as client devices, may include or provide access to various types of memory. The data storage device may include or provide access to a "storage subsystem" having a number of mass storage devices, such as disk drives, which may be in a disk array. The storage subsystem may be located locally or remotely from the data storage device. Reading data from the drives and writing data to the drives can be controlled by an operating system and use a random access memory (RAM) type "main memory".

The processor(s) of the data storage device may have direct access to the main memory via an address and data bus connection or interface. As part of the main memory, the data storage device may include a cache memory known as buffer cache to store data that is frequently or recently used when reading data from the storage subsystem.

For example, a data storage device may be a server or storage server providing access to a storage subsystem, and having a main memory, and a cache memory to store and retrieve data on behalf of one or more client processing systems (clients). The cache memory may be used to provide quick read and write access to data frequently or recently used (e.g., access without reading the data from the storage subsystem). When data in the cache memory is going to be evicted (e.g., deleted, or written over), an additional cache memory or a "victim cache" memory may also exist in the main memory to store the data to be evicted, to continue to provide quick read and write access to the data. When the victim cache becomes full, data in the victim cache will also need to be evicted. Thus, access to data evicted from the victim cache will again require accessing the copy of that data in the storage subsystem. Since cache memory is typically more expensive than storage subsystem memory, it is desirable to ensure that cache memory size and algorithms for inserting, looking-up and evicting data from cache memory are optimal for peak performance.

SUMMARY OF THE INVENTION

The present invention includes dynamically analyzing look-up requests from a cache look-up algorithm to look-up data block tags corresponding to blocks of data previously inserted into a cache memory, to determine a cache related parameter. After analysis of a specific look-up request, a block of data corresponding to the tag looked up by the look-up request may be accessed from the cache memory or from a mass storage device.

DETAILED DESCRIPTION

Figure 1:
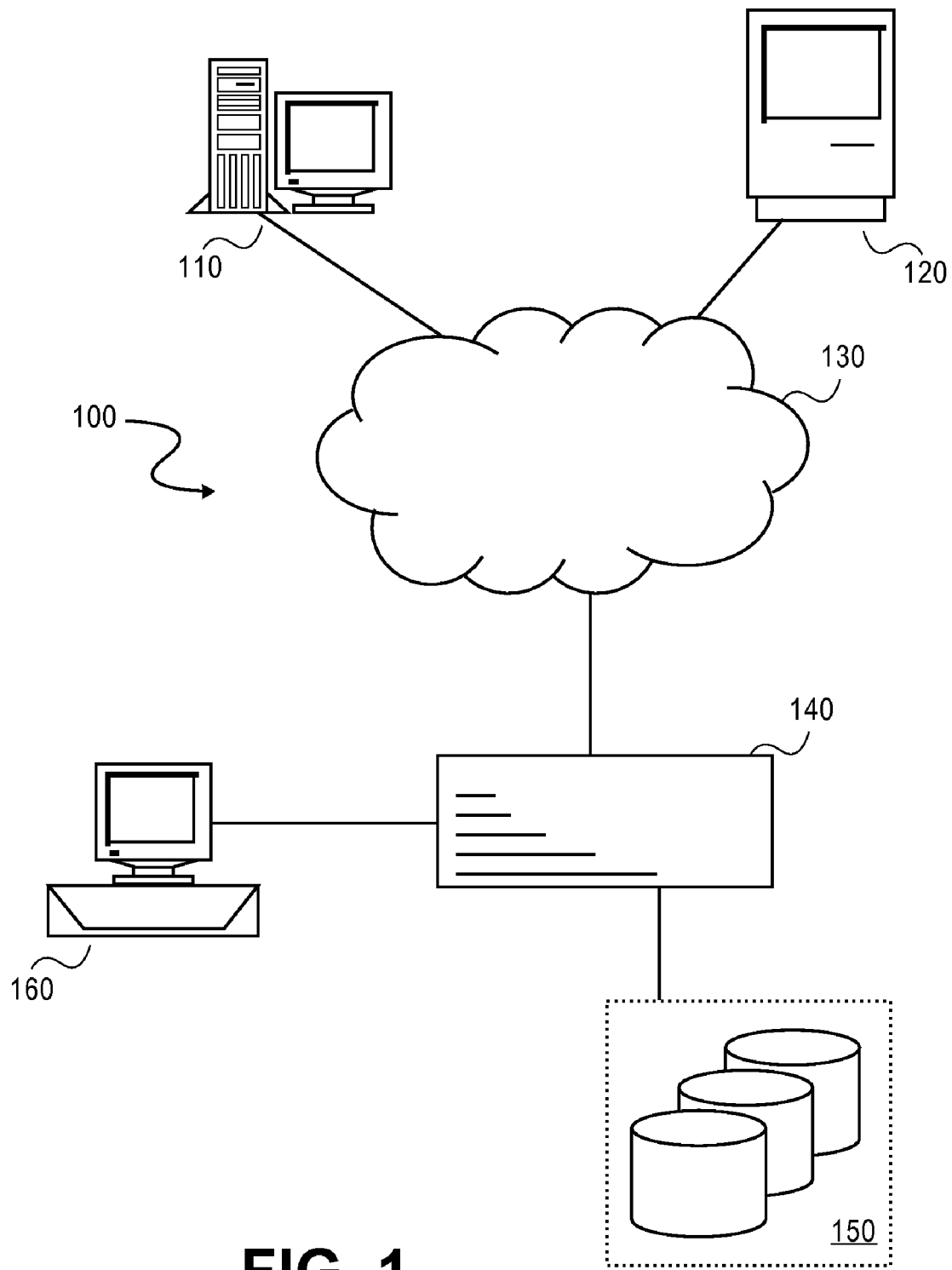
FIG. 1 shows an example of a network environment.

According to some embodiments of the invention, it is possible to dynamically optimize cache memory. Such dynamic optimization may be performed by dynamically analyzing cache memory use, dynamically updating cache memory related parameters, and/or creating a virtual cache memory defined by tags to data blocks evicted from a buffer cache memory. For instance, depending on the size of and frequency of access to the storage subsystem and cache memory (e.g., main memory) of computing devices, such as servers and storage servers, algorithms for looking-up, and evicting data from cache memories of the devices may be updated, optimized and/or adjusted for peak performance.

Dynamically analyzing and updating according to a computing device's cache usage, as described herein, can provide more efficient cache usage for peak performance. Dynamically analyzing or updating may be described as analyzing or updating based on an initial look-up request according to a cache look-up algorithm prior to receiving a subsequent data look-up request according to the cache look-up algorithm. In some cases, "dynamically" may describe a real-time process or process performed during use of the cache memory (e.g., while data is being inserted, looked-up, and/or evicted from cache memory), as opposed to an analysis or update performed by gathering data after a use of the cache memory (e.g., after completion of execution of a software application (other than the operating system) that uses cache memory). For instance, dynamically analyzing, updating, or determining a cache related parameter may include performing those processes based on a look-up request, prior to accessing and/or using the data looked up by the look-up request.

Moreover, dynamically analyzing and updating may be described as "on-the-fly", "inline", and/or "state-dependent". For instance, "on-the-fly" may mean that a virtual cache (e.g., a simulation of a victim cache), and/or dynamic analyzing and updating thereof, executes at the same time as the real buffer cache operations (i.e., while the real buffer cache operations are in flight, or in the process of being executed). Also, the virtual cache memory, and/or dynamic analyzing and updating thereof, may be described as "inline" in that it adds function calls directly in the normal execution paths of buffer cache operations. Further, virtual cache memory, and/or dynamic analyzing and updating thereof, can be called "state-dependent" in that the inline analysis takes into account the current state of the system (tags, block type, hit, miss, etc.). In some cases, analyzing and updating dynamically may be defined when virtual cache memory exists, look-up requests to lookup data in the virtual cache memory exist, and/or counters associated with tags corresponding to data previously inserted into a victim cache memory exist at the same time that buffer cache memory exists, look-up requests to lookup data in the buffer cache memory exist, and/or counters associated with tags corresponding to data previously inserted into a buffer cache memory exist. In other words, dynamic aspects of analyzing and updating may be called "inline, state-dependent analysis of look-up requests" in some embodiments, such as where the inline virtual cache memory is dynamically analyzed and updated using the actual request stream in real-time and the virtual cache memory, dynamic analyzing and dynamic updating are implemented with minimal space and CPU overhead.

Inserting data into cache memory may include inserting, writing, and/or storing a copy of data, and/or creating data block tags corresponding to the inserted data. Looking up data in cache memory (e.g., such as using a look-up request) may include looking up and/or searching through memory to find a tag corresponding to data that it is desired to access or read from cache memory. Also, evicting data from cache memory may include evicting data, writing over data, erasing data, discarding data, removing data, and/or deleting data from cache memory. Algorithms for inserting a copy of data, and/or creating data block tags corresponding to the inserted data contemplated herein may include but are not limited to such algorithms as known in the industry. Similarly, algorithms for looking up data in cache memory contemplated herein may include but are not limited to such algorithms as known in the industry. Likewise, algorithms for evicting data from cache memory contemplated herein may include but are not limited to such algorithms as known in the industry.

Also, a virtual cache allows for analysis of various cache data capacity sizes, so that an optimal size can be determined for a computing device's cache usage. Since cache memory is typically more expensive than storage subsystem memory, it is desirable to have enough, but not too much, cache memory. For instance, it is also possible to determine or identify an optimal cache memory size for peak performance, based on the dynamic analysis.

FIG. 1 shows a simple example of a network environment 100, containing computers 110 and 120, which act as clients of server 140. The clients communicate with the server through a medium such as network 130. Computer system 160 may be useful to configure, monitor, or manage server 140. Server 140 may provide data storage services to its clients, such as using disks 150.

Network 130 may be or include a local area network (LAN), intranet, wide area network (WAN), a global area network (GAN) such as the Internet, and/or various other networks over which data is communicated using wired optical, wireless, acoustical, electromagnetic radiation, or other medium as known in the art. Also, computers 110 and 120 may be, for example, a desktop computer, a laptop computer, a hand held computing device, a personal computer (PC), work station, electronic device, computational device, or the like, as known in the art.

Server 140 may represent a data storage device, storage, server, network server, file server, where reading data from mass storage devices (e.g., disks 150) and writing data to mass storage devices of the server is controlled by an operating system (OS). It is considered that server 140 may be a file server, or could be a server that provides clients with block-level access to stored data (such as used in a storage area network (SAN)), or a server than can provide both file-level or block-level access to the stored data. For example, server 140 may have extensive storage resources and services, protected by a data redundancy scheme such as a redundant array of inexpensive or independent disks (RAID), backup, and power reliability measures. Data storage services may be provided on a per-file basis, where server 140 appears as to its clients as a network file server, or on a per-block basis, where server 140 appears to the clients as a directly-attached disk drive. "Blocks of data" or "data blocks" may include or consist of, for example, 1,024 (1K) bytes, 4,096 (4K) bytes, or other numbers of bytes of user data. In either situation, server 140 may need to move large quantities of data about, both internally and between its clients and its mass storage devices. Each block of data may be uniquely identified by a file system identification (FSID) number and a block number.

Specifically, server 140 may control a number of storage subsystems, such as disks 150. Server 140 may also control a storage system, such as discs 230 of FIG. 2. As described herein, a storage subsystem may include one or more mass storage devices, disk arrays, mass storage devices organized into one or more volumes of a RAID, storage facilities, non-volatile storage facilities, and/or other non-cache memories. It is also considered, that in some cases, the storage subsystem may be a "storage system" such disks 230 of FIG. 2. Each mass storage device may be, for example, a conventional magnetic disk, an optical disk such as a compact disk-read only memory (CD-ROM), or digital video disk (DVD) based storage, magneto-optical (MO) storage, organic, biological, or any other type of non-volatile storage devices suitable for storing large quantities of data as known in the art. A storage subsystem (e.g., having storage subsystem memory) and/or mass storage devices may be memory other than a main memory of a computing device (e.g., server 140), or may be memory other than a memory a processor of a computing device (e.g., server 140) has direct access to via an address and data bus (such as memory 220 of FIG. 2). Specifically, disks 150 may include one or more mass storage devices (e.g., may be a disk array) and may be considered "a storage subsystem" for server 140.

According to some embodiments, it is also contemplated that server 140 may be a computing device, such as a general purpose computing device and/or special purpose computing device, a data storage device and/or system, a network server, a network-based storage environment and/or device, a file server, an Internet server, computer 110, a desktop computer, a portable computing device, a handheld computing device, a telephone, a cellular telephone, a gaming device, an Internet related computing device, a digital video disk (DVD) player, a set top box, etc., and/or another device or system that may access or include a cache memory to provide quick read and write access to data frequently or recently used. In other words the concepts described herein for server 140 may also be applied to computing devices, other than "servers", that include a cache memory.

Figure 2:
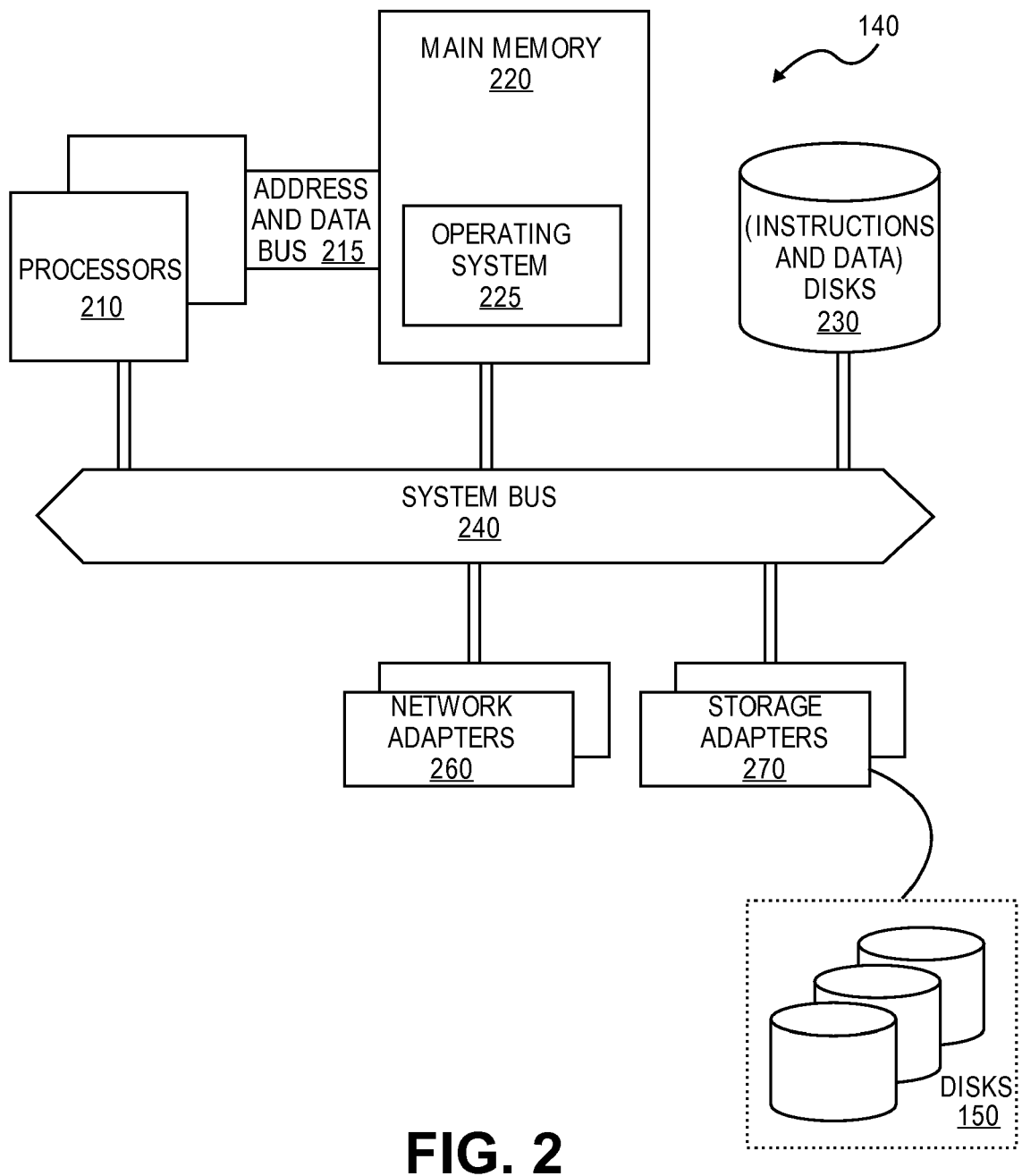
FIG. 2 is a block diagram showing an architecture of a server.

Server 140, may be a storage server having a storage subsystem (e.g., disks 150), main memory, and cache memory to store and retrieve data on behalf of one or more client processing systems (clients). For instance, FIG. 2 is a block diagram showing an architecture of server 140 and some components thereof, according to certain embodiments of the invention. Certain standard well-known components, which are not germane to the present invention, may not be shown. Server 140 includes components, such as one or more processors 210, and memory 220 coupled to system bus 240. Bus 240, shown in FIG. 2, is an abstraction that represents any one or more separated physical buses and/or point-to-point connections, connected by appropriate bridges, adapters and/or controllers. Bus 240, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire"). In some cases, bus 240, is a host bus, such as a bus to interface a host (e.g., processors 210) to peripheral devices (e.g., disks 150).

Processors 210 may be the central processing units (CPUs) of server 140 and, thus, control and coordinate the overall operation of the server. In certain embodiments, the processors 210 accomplish this by executing software, such as operating system 225 stored in memory 220. A processor of processors 210 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 220 may be or include the "main memory" of server 140. Memory 220 represents any form of random access memory (RAM), read-only memory (ROM), flash memory, or the like, or a combination of such devices. Memory 220 may include various types of memory, such as RAM, dynamic RAM ("DRAM"), standard dynamic RAM ("SDRAM"), double data rate RAM "DDRRAM", and double data rate version 2 RAM, "DDR2RAM". For instance, memory 220 may be one or more banks of memory chips, integrated circuits, types of RAM, etc. as known in the art. Processors 210 have direct access to main memory 220 via an address and data bus 215. Address and data bus 215 may be an address and data bus as know in the art.

Also connected to processors 210 through bus 240 are disks 230, storage adapters 270 and network adapters 260. Disks 230 may be one or more internal mass storage devices including any conventional medium for storing large volumes of data in a non-volatile manner, such as describe above for disks 150 (e.g., one or more magnetic or optical based disks). Disk 230 may contain other instructions and data that are not immediately required by the system in its operations. According to some embodiments, disks 230 may be considered a "storage system" for server 140. As described herein, a "storage system" may include one or more mass storage devices, storage facilities, non-volatile storage facilities, and/or other non-cache memories.

Network adapters 260 provide the server with the ability to communicate with remote devices, such as the computers 110 and/or 120, over a network (e.g., network 130) and may be, for example, an Ethernet adapter or Fibre Channel adapter (e.g., in a SAN implementation). Storage adapters 270 allow the server to access storage subsystems, such as disks 150, and may be, for example, a Fibre Channel adapter or a SCSI adapter. Thus, server 140 can communicate with its clients through network adapters 260, and with its mass storage devices (such as disks 150) through storage adapters 270.

For instance, storage adapters 270 and network adapters 260 may have input/output hardware, adapters, or connectors (e.g., described herein as an I/O) for communicating data between disks 230 and/or disks 150, and remote devices. During such communication, portions or all of the data being communicated may be "cached" in a cache memory, which may or may not be part of main memory 220. Data that is cached may be data that is frequently or recently used when reading data from and writing data to a storage system and/or subsystem (e.g., when server 140 is reading data from and writing data to the drives of disks 150 and/or 230).

A cache memory, such as a file system buffer cache, may be a low latency, high bandwidth memory (usually implemented using DRAM hardware) that is used to store file system data for fast access. Since the size of the cache memory is small relative to stable store (e.g. non-volatile) or storage system or subsystem memory (e.g., disks) and is more expensive, a cache memory is typically used as efficiently as possible. Therefore, it is useful to have a mechanism, software application, and/or process to dynamically analyze the use of the cache memory, efficiency of the cache memory algorithms and, if desired, modify them dynamically. Also, since cache memory is expensive (e.g., more expensive than storage system or subsystem memory), it is not desirable to purchase or use cache memory having a size in excess to that desired for peak performance of a computing device and/or server.

Operating system 225 may include or be built "on top of" a conventional OS, such as disk operating system (DOS), Windows, Unix, Linux, OS/2, OS/9, Xenx, etc. as known in the art. For instance, operating system 225 may include an operating system such as WINDOWS XP®, or another WINDOWS® operating system by Microsoft Corporation of Redmond, Wash. Operating system 225 may also include a MACINTOSH® operating system by Apple Computer of Cupertino, Calif. Also, an example of operating system 225 may be or include, without limitation thereto, Data ONTAP™ by Network Appliances, Inc. of Sunnyvale, Calif. Data ONTAP™ is commercially available from or sold by Network Appliances, Inc. of Sunnyvale, Calif.

Moreover, server 140 may include, store, load, and execute or run a computer program, operating system 225, a file system, a filer software application or other software application, or a sequence of instructions to dynamically analyze cache memory use, dynamically update cache memory related parameters, and/or create a virtual cache memory defined by tags to data blocks evicted from a buffer cache memory as described herein (e.g., see FIGS. 3-7).

The file system or filer software application may be part of operating system 225. Also, operating system 225, the filer application, and/or another software application to perform the functions described herein may be loaded into memory 220, such as from a storage system like disks 230 (or in some embodiments from a storage subsystem such as disks 150), and launched after power on self test (POST), boot-up, or initialization of server 140. Operating system 225, the filer application, and/or another software application to perform the functions described herein may each be a set of one or more programs which control server 140's operation, the allocation of resources, and the caching of data.

For instance, such functions include those performed by an insertion algorithm to insert blocks of data into cache memory, an eviction algorithm to evict blocks of data from a cache memory (e.g., by writing over the blocks or deleting them), and/or a look-up algorithm to look up blocks of data from cache memory (and to access a storage subsystem to retrieve the data if it is not found or successfully looked-up in the cache memory).

Specifically, operating system 225 may include or access a machine accessible medium (e.g., disks 150 and/or 230) containing a sequence of instruction (such as including a filer or other application) that when executed by a processor (such a processors 210) cause server 140 to dynamically analyze cache memory use, dynamically update cache memory related parameters, and/or create a virtual cache memory defined by tags to data blocks evicted from a buffer cache memory as described herein.

Figure 3:
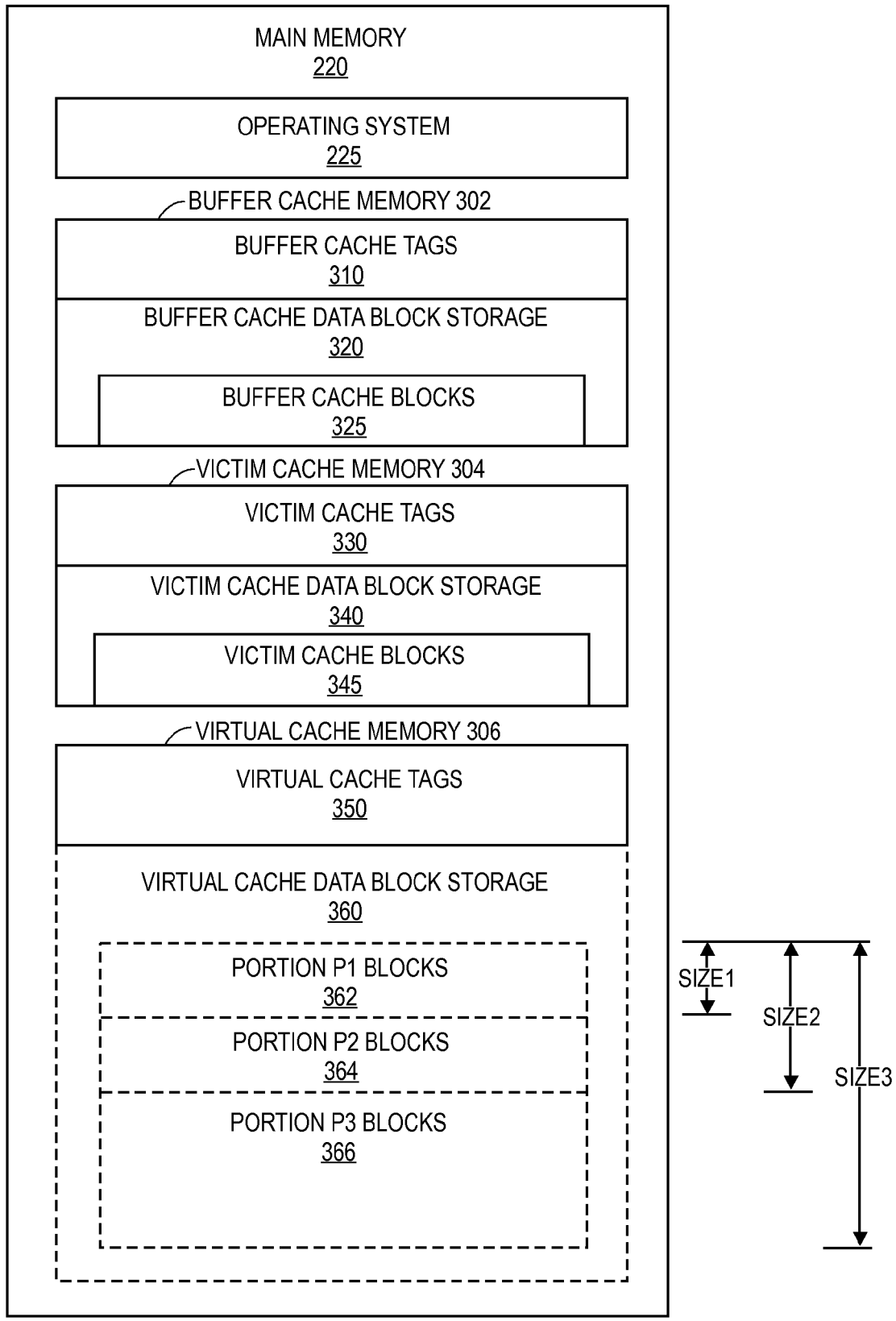
FIG. 3 shows a block diagram of a main memory having a virtual cache, in accordance with an embodiment of the invention.

For instance, FIG. 3 shows a block diagram of a main memory having a virtual cache, in accordance with an embodiment of the invention. FIG. 3 shows a block diagram of the data block tags, data block storage, data blocks, memory sizes, memory sections, memory portions, memory addresses and/or storage locations that may be present in an embodiment of memory 220 of FIG. 2. For instance, FIG. 3 shows main memory 220 including (such as by storing, and/or reserving or having a data size to store) buffer cache memory 302, victim cache memory 304, and virtual cache memory 306. In addition, main memory 220 includes operating system 225, buffer cache tags 310, buffer cache data block storage 320, victim cache tags 330, victim cache data block storage 340, virtual cache tags 350, and virtual cache data block storage 360. As described herein, a buffer cache memory (e.g., memory 302) may be defined or described as buffer cache tags (e.g., tags 310) in combination with buffer cache data block storage (e.g., storage 320). Similarly, a victim cache memory (e.g., memory 304) may be described as victim cache tags (e.g., tags 330) in combination with victim cache data block storage (e.g., storage 340). Also, a virtual cache memory (e.g., memory 306) may be described as virtual cache data block storage (e.g., storage 360) and/or virtual cache tags (e.g., tags 350). A virtual cache memory may be defined as the virtual cache tags alone since the data blocks are virtual and may not actually be stored in memory. According to embodiments of the invention, memory 302, 304, and/or 306 may be described as a "cache memory." Specifically, reference to "cache memory" or "a cache memory" herein may correspond to a main memory containing memory 302 and 306; or containing memory 302, 304 and 306.

A virtual cache memory data block tag (e.g., tags 350) may identify or include data associated with, derived from, identifying, or otherwise related to blocks of data inserted into cache memory (such as data inserted into virtual cache memory 306). For instance, without limitation thereto, tags 350 may include some or all of the types of information typically stored in a buffer cache memory data block tag, as known in the industry. Moreover, in addition to those types of buffer cache information, tags 350 may include additional information related to blocks of data inserted in cache memory (such as data inserted into virtual cache memory 306), such as information that is not currently used in data block tags as known the industry. In some cases, each tag of tags 350 may identify a filer, volume, data type (e.g., metadata or normal data), etc. for a block of data inserted into virtual cache memory 306.

Tags stored in tags 310, 330, and/or 350 may be stored in a simple array or sequential order. Alternatively, they may be allocated from and returned to a global pool of tags. Likewise, the blocks of data stored in blocks 325, 345, 362, 364 and/or 366 may be stored in a simple array or sequential order. Tags 310 may be stored or saved in main memory 220 at locations or addresses adjacent in sequence with locations or addresses for storing storage 320. Similarly, tags 330 may be stored or saved in main memory 220 at locations or addresses adjacent in sequence with locations for addresses for storing storage 340. Also, according to embodiments, tags 350 may be stored or saved in main memory 220 at locations or addresses adjacent in sequence with locations or addresses for memory 302, or locations or addresses for memory 304.

Moreover, it is considered that the data storage size required to store each tag of tags 350 may be substantially less than that required to store each tag of tags 310 or tags 330. For example, each tag of tags 350 may require one, two, four, eight, ten, twenty, a combination thereof, or any number of and/or fraction of bytes. Alternatively, each tag of tags 310 and/or tags 330 may require a data storage size of 20, 30, 40, 80, 100, 200, any combination thereof, any number in between, of bytes of data storage. In some cases, each tag of tags 350 may require 4 bytes, between 4 and 8 bytes, or 8 bytes of storage space per 4 Kilo-Bytes of blocks of virtual data inserted into virtual memory (e.g., as opposed to buffer cache tags that may require approximately 100 bytes of storage space). For instance, the virtual cache memory (e.g., memory 306) may require an actual physical memory data storage size (e.g., tags 350) that is substantially less than the physical memory required to store the buffer cache (memory 302), the buffer cache plus the victim cache (memories 302 and 304), a main memory (e.g., memory 220), or system memory. For instance, the virtual cache memory actual physical memory data storage size may be approximately equal to or less than one or two percent of a total data size of the physical memory required to store the buffer cache, or the buffer cache plus the victim cache.

Buffer cache storage 320 may store, have inserted therein, have evicted therefrom, have written over therein, have stored therein, and/or have a data size to store blocks of data corresponding to buffer cache tags 310. These blocks of data are shown in FIG. 3 as buffer cache blocks 325. Likewise, victim cache storage 340 may store, have inserted therein, have evicted therefrom, have written over therein, have stored therein, and/or have a data size to store blocks of data corresponding to victim cache tags 330. These blocks of data are shown in FIG. 3 as victim cache blocks 345.

Storage 360 includes portions P1, P2 and P3 (e.g., by being divided into portions P1-P3 which are each a portion of a total maximum reserved data storage size of storage 360. Portions P1, P2 and P3 may store, have inserted therein, have evicted therefrom, have written over therein, have a data size to store blocks of data corresponding to virtual cache tags 350. The virtual blocks of data are shown in FIG. 3 as virtual cache blocks 362, 364, and 366, that may be "stored" in, "inserted" in, "evicted" from, written over in, have a data size reserved to store, and/or be associated with portions P1, P2 and P3, respectively, as shown in FIG. 3.

As shown in FIG. 3, main memory 220 includes buffer cache memory 302 to store data that is frequently or recently used when reading data from and writing data to a storage system or subsystem (e.g., when server 140 is reading data from and writing data to the drives of disks 150 and/or 230). This cache memory may be known as a "main cache", "block cache" (e.g., because it stores data on a per-block basis), and/or "buffer cache", and may be a RAM type memory.

For example, buffer cache memory 302 may provide a selected, set, and/or adjustable amount of cache memory data storage size of disk cache using the motherboard RAM. Memory storage and retrieval functions of the cache memory are typically performed by electronic integrated circuits. The circuits are often packaged in a form known as a dual in-line memory module, or "DIMM." This term will be used herein, but it should be recognized that the discussion applies equally to any memory device having the characteristics described, and not only to memories in the specific DIMM package. For instance, a DIMM may include standard dynamic RAM ("DRAM") devices available today (including synchronous DRAM, "SDRAM;" double data rate, "DDR;" and double data rate version 2, "DDR2" devices).

In addition, as part of or separate from main memory 220, server 140 may also use cache memory in addition to the main or buffer cache memory. For example, as shown in FIG. 3, server 140 may include victim cache memory 304 to store data that is frequently or recently used when reading data from the drives and writing data to disks 230 and/or disks 150, after that data is evicted from buffer cache memory 302. Accordingly, victim cache memory 304 may store data or blocks of "victim" cache data selected for eviction or removal from buffer cache memory 302. Thus, victim cache memory 304 may be known as a "secondary cache", and/or "victim cache" (e.g., because it stores data evicted from the buffer cache, e.g., victims of the buffer cache eviction algorithm), and may be a RAM type memory or flash memory.

Victim cache memory 304 of server 140 may be memory which resides locally with respect to processors 210 (e.g., by memory 220, as shown in FIG. 3), or by one or more expanded memory devices that may be removable (such as Solid State Disks). As opposed to a local memory (e.g., main memory 220) which has an address and data bus interface and a host bus interface (e.g., have bus 215 and 240 to interface with processors 210), an expanded device may only have a host bus interface (e.g., only have bus 240 to interface with processors 210). As an illustrative example providing some memory data storage sizes to show the benefits of using a victim cache memory, buffer cache memory 302 may be between 6 and 16 Giga-bytes of disk cache using the motherboard RAM, and a victim cache memory can provide as 6-16 Giga-bytes of motherboard RAM, or 64 Giga-bytes of remote victim cache memory separate from memory 220, that may be installed on an add-in card, such as a PCI memory card. Solid State Disks can have higher capacities (e.g., 128-256 Giga-bytes). These numbers are only illustrative, and various other amounts of memory for the buffer, local victim cache, and/or remote victim cache are considered.

In addition to a buffer cache, or a buffer cache and a victim cache, memory 220 may have additional actual cache memory and/or a virtual cache memory. For example, a virtual cache memory may be defined by virtual cache memory tags (e.g., tags 350) corresponding to blocks of data "inserted" into a virtual cache memory but not stored (e.g., where the blocks of data are not actually stored in the cache memory), since the data blocks corresponding to the virtual cache memory tags are "virtual" and are not stored and do not exist in the main or cache memory.

Actual cache memory (e.g., memory 202 and 204) is memory including storage of cached blocks of data that can be access by the processor from that cache memory. On the other hand, virtual cache memory "pretends" to, but does not include storage of the cached blocks of data, so the processor must access the data from memory other than cache memory, such as from storage subsystem. The virtual cache memory may pretend to include storage of the cached blocks of "virtual" data by including tags so that a look-up request for a "virtual" block of data "stored" in the virtual memory finds the corresponding tag when the "virtual" block is not actually stored in the virtual memory. More particularly, when an operating system or application can dynamically analyze, update, and/or determine a cache related parameter based on the look-up request receives a look-up request for a "virtual" block of data "stored" in a virtual cache memory pretending to be additional cache memory, the computing system or application can find and match the data block tag (which is actually stored in the virtual cache memory) corresponding to the "virtual" block of data (not actually stored in the virtual cache memory) with the request. This ability to find and match the request with the tag allows the computing system or application to dynamically analyze, update, and/or determine a cache related parameter based on the look-up request to look-up data in a virtual cache memory. Of course, the same concepts can be applied to an actual cache memory (e.g., buffer and/or victim cache memory), where the data blocks are actually stored. Virtual cache memory may be implemented by storing, in memory (e.g., main memory), data block tags corresponding to blocks of data inserted into the virtual cache memory, without storing the blocks in main memory (e.g., the block may be accessed from a storage system or subsystem).

Accordingly, virtual cache memory 306 may "store" data or blocks of "virtual" cache data selected for eviction or removal from victim cache memory 304. Thus, virtual cache memory 306 may be known as a "third cache", and/or "virtual cache" (e.g., because it stores data evicted from the victim cache, e.g., victims of the victim cache eviction algorithm), and may be stored in a RAM type memory. Blocks of data evicted from virtual cache memory 306 (e.g., by erasing, writing over, deleting, or removing from virtual cache memory 360, the tags corresponding to the blocks) may no longer exist in, be found in, be located in, or be able to be successfully looked up in the virtual cache memory.

FIG. 3 shows virtual cache memory 306, which may be described as storage 360 and/or tags 350. For example, a virtual cache memory may be defined by tags 350 since the data blocks corresponding to tags 350 are "virtual" and are not stored or do not exist in memory 220. Storage for virtual blocks may be considered virtual storage, such as storage 360, shown as dashed structures in FIG. 3. Correspondingly, virtual cache storage 360, portions P1, P2 and P3, and virtual cache blocks 362, 364, and 366, are shown as dashed structures in FIG. 3 because they define a "virtual cache memory" that "pretends" to store data (e.g., by having tags 350 associated with data "inserted" into virtual cache memory 360), but do not actually have or store blocks of data in memory. To some extent, the data "inserted" may be considered "stored" in virtual cache memory 306 as virtual data which does not actually exist and is not actually stored, but for which a corresponding tag exists and is stored in tags 350.

Similar to victim cache memory 304, virtual cache memory 306 of server 140 may be memory that resides locally with respect to processors 210 (e.g., by memory 220, as shown in FIG. 3), or by one or more expanded or external memory devices that may be removable. As an illustrative example providing some memory data storage sizes to show the benefits of using a virtual cache memory, virtual cache memory can be provide as 6-16 Giga-bytes of motherboard RAM, or as 64 Giga-bytes of remote virtual cache memory separate from memory 220, that may be installed on an add-in card, such as a PCI memory card. These numbers are only illustrative, and various other amounts of memory for the local virtual cache, and/or remote virtual cache are considered. Virtual cache memory 306 may be described as a local virtual cache memory (e.g., internal to server 140, such as residing in memory 220 as shown in FIG. 3).

FIG. 3 shows portions P1, P2 and P3 of memory 306 (e.g., by dividing storage 360 into portions P1-P3). Portions P1, P2, and P3 may have sizes that are a fraction of, a multiple of, or any number times the maximum data size of a buffer cache (e.g., times the maximum data storage capacity of memory 302), or of a buffer cache and a victim cache (e.g., times the maximum data storage capacity of memory 302 plus 304), or a desired or selected size of a buffer cache, or of a buffer cache and a victim cache. In some cases, portions P1, P2, and P3 may have a size that is 1×, 2× and 3×; 1×, 2× and 4×; 1×, 2×, and 8×; 2×, 4×, and 8×; 2×, 4×, and 12×; 4×, 8×, and 20×; or 4×, 12×, and 32×, where X may be the size of the buffer cache, or a size of the buffer cache plus the victim cache. It is also considered that X may be the size of the system memory, such as main memory 220, or another portion of memory of a computing system (e.g., such as server 140). Although FIG. 3 shows three portions of the virtual cache, it is contemplated that the virtual cache may have fewer or more than three portions. For example, the virtual cache may have two portions having sizes as described above for any two portions of a three portion virtual cache. Alternatively, the virtual cache may have four portions, each having a size as described above for any portion of a three portion virtual cache. In some cases, a four portion virtual cache may have portions with sizes of 1×, 2×, 4×, and 8×; or a fraction or multiple thereof; of the size of a buffer cache, or buffer cache and victim cache.

As noted above, each tag of tags 350 may require approximately 4 bytes of storage space per 4 Kilo-Bytes of blocks of virtual data inserted into virtual memory (e.g., as opposed to buffer cache tags that may require approximately 100 bytes of storage space). Thus it may be possible to dynamically analyze, dynamically increment counters, dynamically determine cache related parameters, and/or dynamically update cache related parameters and/or algorithms for up to "n" times more actual cache memory (e.g., physical memory) using only 4n/4096 bytes of memory to store the virtual memory tags. So, implementing a virtual memory with a capacity of 4× may require about 0.4% of the amount of main memory (e.g., memory 220). One advantage of this approach is the ability to enable a virtual cache memory, even for small memory systems.

Portions P1, P2, and P3, or other portions as described above of virtual cache memory 306 may be considered separate cache memories, such as where tags and/or blocks of data evicted from one portion are inserted into the next subsequent portion. Tags corresponding to such insertions may be "moved" to or re-generated at the subsequent portion (e.g., such as described above with to generating virtual cache tags 350 for memory 360). It is contemplated that a block of data evicted from portion P1 may be inserted into portion P2 and a block of data evicted from portion P2 may be inserted into portion P3. Moreover, a block of data evicted from portion P1 and inserted into portion P2 may use the same tag corresponding to that block when in portion P1, may use the same tag corresponding to the block of data prior to eviction from portion P1 with updates to that tag; or may cause a new tag to be generated when the block of data is inserted into portion P2. A similar process may occur for blocks of data evicted from portion P2 and inserted into portion P3. Virtual cache tags for blocks of data evicted from portion P3 may be deleted, erased, written over, discarded, and/or removed as described above with respect to evicting blocks from virtual cache memory 360.

Thus, looking up blocks on data in memory 306 may require one, two, or three look-ups into portions P1, P2, and P3, respectively. It can be appreciated that insertions, evictions, and look-ups will require more time and resources as the number of portions of storage 360 increases. For example, inserts, evictions, and look-ups for storage 360 split into one or two portions will require much less time and resources than insertions, evictions, and look-ups for storage 360 split into three, four, or more portions. Look-ups may be done serially from the first portion to the second portion, to subsequent portions of the cache memory, until there is a hit or successful look-up. Data blocks in virtual cache memory 306 may reside, at most, at one of the virtual cache memory portions.

A memory having portions as described above with respect to portions P1, P2, and P3 of FIG. 3 may be described as a "cascaded" cache memory, a "cascaded virtual cache memory," or a "cascaded" memory, and may provide analysis for a number of different sized memories or cache memories. There, for instance, a cascaded virtual cache memory (e.g., memory 306) may define, allow, and/or provide the capability (e.g., a dynamic capability) to optimize, analyze, and/or update multiple sized cache memories, by having portions which can be combined to represent various sizes of cache memory. Thus, for instance, such capability can include combining look-up requests, counters, analysis derived from the counters, statistics derived from the counters, and/or information derived from the counters to blocks of data in the various sized cache memories to provide information for the various sized cache memories, or for various increases in size of a cache memory. For example, FIG. 3 shows sizes Size1, Size2, and Size3 associated with portions P1-P3. Specifically, Size1 corresponds to a maximum data size or storage capability for portion P1; Size2 corresponds to a maximum data size or storage capability for portion P1 plus portion P2; and Size3 corresponds to a maximum data size or storage capability for portion P1, plus portion P2, plus portion P3. Thus, counters may be incremented or updated, analysis may be performed, and statistics may be updated using cascaded memory portions P1 through P3 to simulate a memory having sizes Size1 through Size3, or to simulate or analyze increasing a memory by an amount equal to sizes Size1 through Size3. Specifically, count increments or updates, analysis and/or statistics to simulate or analyze a memory size or size increase may be performed for Size1 by considering portion P1; for Size2, by considering portion P1 plus or combined with portion P2; and for Size3 by considering portion P1, plus portion P2, plus portion P3.

It is contemplated that the victim cache need not be included in all embodiments of the invention, such as where data evicted from buffer cache memory is inserted directly into virtual cache memory (e.g., copies of blocks being evicted from the buffer cache are inserted into the virtual cache prior to the next look-up). In such embodiments, main memory 220 need not include memory 304. Moreover, it is also contemplated that the buffer cache need not be included in all embodiments of the invention as well. In those embodiments, data to be cached may be cached directly into the virtual cache memory (e.g., copies of blocks accessed from a storage subsystem are inserted into virtual cache prior to the next look-up). Such data may be inserted into the virtual cache but not actually stored there. Thus, when the data is looked up, according to or by a look-up request from a look-up algorithm, a tag for the data may be found at tags 350, but the data or block(s) corresponding to that tag will not be found, and instead can be accessed from a storage subsystem. In such embodiments, memory 220 need not include memory 302 or 304.

In addition to including cache memory (actual and/or virtual), main memory 220 may include memory to store process stacks, to store global variables, and memory to store file system data blocks (e.g., buffer cache memory), such as is known in the art. Data may be stored in the storage system, the a storage subsystem, main memory, cache memory, buffer cache memory, victim cache memory, and/or virtual cache memory on a per-file and/or on a per-block basis. Each tag may identify one or more blocks of data according to the FSID number and block number of each block.

Figure 4:
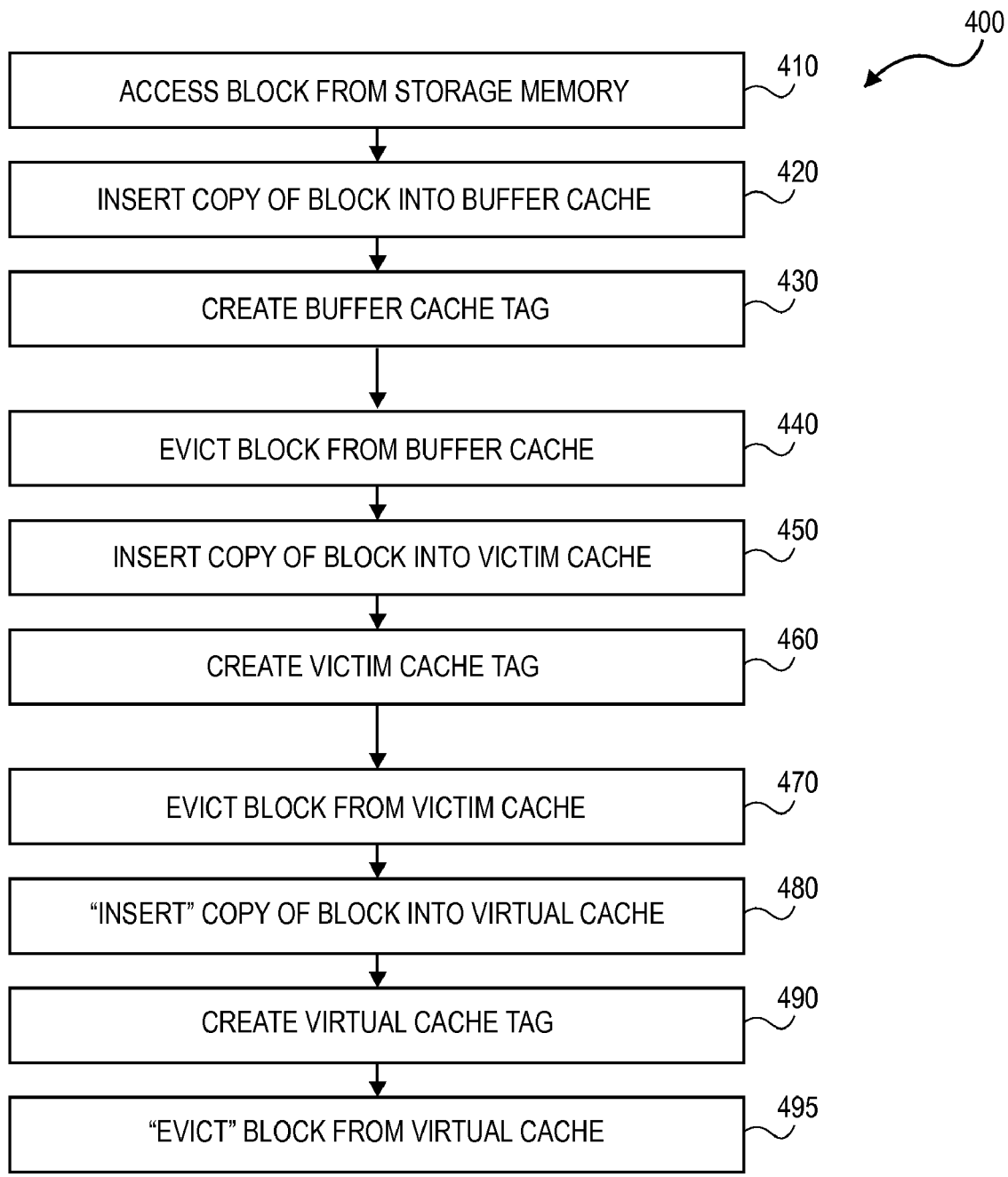
FIG. 4 is a flow diagram of a process for inserting and evicting blocks of data from cache memories, in accordance with an embodiment of the invention.

FIG. 4 is a flow diagram of a process for inserting and evicting blocks of data from cache memories, in accordance with an embodiment of the invention. FIG. 4 shows process 400, which may be a process for inserting blocks of data (such as by writing, copying, or storing data) and evicting blocks of data (such as by writing over, discarding, removing, or deleting the data) from cache memories, such as buffer cache 302, victim cache 304, and/or virtual cache 306. Data (e.g., blocks of data) may be inserted into buffer cache memory, victim cache memory, and/or virtual cache memory by an insertion and/or eviction algorithm.

For instance, process 400 may be a process performed entirely or in part by an insertion algorithm and/or eviction algorithm which may be part of operating system 225, a filer application, and/or another software application as described above with respect to memory 220 of FIG. 2. At operation 410, a block of data is accessed from a storage subsystem. Operation 410 may include a processor (e.g., processors 210) accessing data stored in a storage subsystem (e.g., discs 150) to read data from the storage subsystem or write data to the storage subsystem (such as for server 140 retrieving data on behalf of one or more client processing systems).

At operation 420, a copy of the block of data is inserted into buffer cache memory. Operation 420 may include an insertion algorithm causing one or more blocks of data accessed at operation 410 to be copied, written, stored, or "cached" into a buffer cache memory (e.g., buffer cache memory 302).

At operation 430, a buffer cache tag is created for the blocks of data inserted into the buffer cache at operation 420. Operation 430 may include an insertion algorithm creating one or more buffer cache memory data block tags, each tag corresponding to one or more blocks of data inserted into the buffer cache memory. For example, the tags created at operation 430 (e.g., tags 310) may be stored in a portion of main memory located, addressed, or otherwise included in or adjacent to the buffer cache memory (e.g., memory 302) containing the buffer cache blocks corresponding to those tags (e.g., buffer cache blocks 325). Alternatively, tags 310 may be stored in a different location of memory 220 that is not adjacent to storage 320. For example, tags 310, tags 330, and tags 360 may be stored in one location of memory 220; while storage 320, storage 340, and storage 360 are stored at one or more other locations of memory 220.

At operation 440, blocks of data are evicted from the buffer cache memory. Operation 440 may correspond to an eviction algorithm causing one or more blocks of data to be evicted, written over, or deleted from the buffer cache memory (e.g., buffer cache memory 302). Thus, blocks of data evicted from buffer cache at operation 440 may no longer exist in, the found in, be located in, or be able to be successfully looked up in the buffer cache (e.g., a look-up request will be unsuccessful in looking these blocks of data up in memory 302). The block or blocks of memory evicted at operation 440 may be evicted from buffer cache blocks 325, and may be subsequently inserted into a victim cache memory (e.g., victim cache memory 304), or a virtual cache memory (e.g., virtual cache memory 306) if a victim cache memory does not exist in main memory. The data blocks to be evicted at operation 440 may be identified by their buffer cache tags (e.g., tags 310).

At operation 450, a copy of the block of data evicted at operation 440 is inserted into victim cache memory. Operation 450 may include an insertion algorithm causing one or more blocks of data evicted at operation 440 to be copied, written, stored, into a victim cache memory (e.g., victim cache memory 304).

At operation 460, a victim cache tag is created for the blocks of data inserted into the victim cache at operation 450. Operation 460 may include an insertion algorithm creating one or more victim cache memory data block tags, each tag corresponding to one or more blocks of data inserted into the victim cache memory. For example, the tags created at operation 460 (e.g., tags 330) may be stored in a portion of main memory located, addressed, or otherwise included in, or adjacent to the victim cache memory (e.g., memory 304) containing the victim cache blocks corresponding to those tags (e.g., victim cache blocks 345). Alternatively, tags 330 may be stored in a different location of memory 220 that is not adjacent to storage 340.

At operation 470, blocks of data are evicted from the victim cache memory. Operation 470 may correspond to an eviction algorithm causing one or more blocks of data to be evicted, written over or, deleted from victim cache memory (e.g., victim cache memory 304). Thus, blocks of data evicted from victim cache at operation 440 may no longer exist in, the found in, be located in, or be able to be successfully looked up in the victim cache memory (e.g., a look-up request will be unsuccessful in looking up these blocks of data in memory 304). The block or blocks of memory evicted at operation 470 may be evicted from victim cache blocks 345, and may be subsequently inserted into a virtual cache memory (e.g., virtual cache memory 306). The data blocks to be evicted at operation 470 may be identified by their victim cache tags (e.g., tags 330).

For instance, further describing operations 410-470, server 140 may place user data on mass storage devices (e.g., disks 150 and/or 230) for long-term availability (e.g., accessed at operation 410), but to improve performance and throughput, it may be beneficial to store, or "cache," copies of the user data in buffer cache memory 302 (e.g., at operation 420 and 430). Eventually, storage 320 may become full of these cached copies of user data, and a least-recently-used ("LRU"), first-in-first-out ("FIFO"), RoundRobin, 2-handed clock algorithm (e.g., for insertion/eviction of data blocks into/from the virtual cache), and/or similar eviction algorithm may be employed to determine which cached data to evict or remove, when it is desired to store copies of new data. Blocks of data selected for removal (e.g., at operation 440) are called "victims," and would normally be discarded from storage 320 to make room for the new data. (The discarded victim data can, of course, be read in again from mass storage devices (e.g., disks 150 and/or 230) if necessary. The memory caching to cache memories 302 and 304 described here only effects system performance, not data integrity.

Improved system performance may be possible if, instead of simply discarding cache victim data blocks, they are copied to a "victim" cache memory, such as victim cache memory 304 (e.g., at operations 450 and 460). Accordingly, victim cache storage 340 may store data or blocks of "victim" cache data selected for removal from buffer cache memory 302. Similar to memory 302, when victim cache storage 340 becomes full of the victim cached copies of user data, a LRU or similar eviction algorithm may be employed to determine which victim cached data to evict or remove, when it is desired to store copies of new victim data. Blocks of victim cache data selected for removal (e.g., at operation 470) would normally be discarded from the victim cache to make room for the new data.

However, according to some embodiments, it is possible to dynamically analyze buffer, victim, and or virtual cache memory use by counting look-up requests to data block tags corresponding to blocks of data inserted (e.g., stored or not stored) in the buffer cache. Likewise, according to some embodiments, it is possible to dynamically update cache memory related parameters by updating statistics derived from counting look-up requests to data block tags corresponding to blocks of data inserted in the buffer cache. Furthermore, according to some embodiments, it is possible to create a virtual cache memory defined by tags to data blocks evicted from the victim cache memory (or the buffer cache of no victim cache exists).

Virtual Cache Memory

For instance, instead of simply discarding the victim cache data to be evicted or removed (e.g., at operation 470), that data may be "stored" in or "inserted" into a virtual cache (e.g., see operation 480) by creating a virtual cache data block tag (e.g., see operation 490) for the blocks of data to be evicted or removed from the victim cache, and pretending to store the blocks of data to be removed in a virtual cache.

A similar concept applies to data discarded from the buffer cache, when a victim cache does not exist. Instead of discarding the buffer cache data to be removed (e.g., at operation 440), that data may be stored or inserted into virtual cache (e.g., at operation 480) by creating a virtual cache data block tag (e.g., at operation 490) with the blocks of data to be removed from the buffer cache.

As noted above at FIG. 3, the virtual cache memory (e.g., memory 306) may pretend to store data by having tags for blocks of data inserted into the virtual cache, but by not actually storing the blocks. Thus, when tags are evicted or removed from the victim cache, the corresponding blocks to those tags no longer exist or are no longer "stored" in virtual cache memory (e.g., a look-up will not find the tags or blocks in memory 302, 304, or 306 until they are re-cached). Subsequently, when the processor or operating system desires to access the evicted blocks in a virtual cache, it may access those blocks from a storage subsystem (e.g., see operation 410). To clarify, since the data blocks are not stored in the virtual memory, accessing those blocks will require accessing them from a different memory; however, if the blocks are virtually "stored" in the virtual cache memory, a look-up request will find those block's corresponding tags, while if the blocks have been evicted (e.g., their tags have been evicted), then a look-up request will not find those data blocks "stored" in the virtual cache memory.

At operation 480, data blocks evicted from victim cache memory (e.g., memory 304) are "inserted" into virtual cache memory (e.g., memory 306). At operation 480, a copy of the block of data is "inserted" into virtual cache memory. Operation 480 may include an insertion algorithm causing one or more blocks of data evicted at operation 470 to be "cached" into a virtual cache memory (e.g., virtual cache memory 306).

At operation 490, a virtual cache tag is created for the blocks of data inserted into the virtual cache at operation 480. Operation 490 may include an insertion algorithm creating one or more virtual cache memory data block tags, each tag corresponding to one or more blocks of data inserted into the virtual cache memory. For example, the tags created at operation 490 (e.g., tags 350) may be stored in a portion of main memory 220 located, addressed, or otherwise included in memory, or adjacent to the tags 310 and/or tags 330. Alternatively, tags 350 may be stored in a different location of memory 220 that is not adjacent to tags 310 and/or tags 330. Operation 490 may include creating a tag such as a tag having less information than a buffer cache tag (e.g., tags 310), victim cache tag (e.g., tags 330), or another cache memory tag known in the art. Specifically, a virtual cache tag may require less data storage size to be stored than a buffer cache tag or a victim cache tag.

Figure 5:
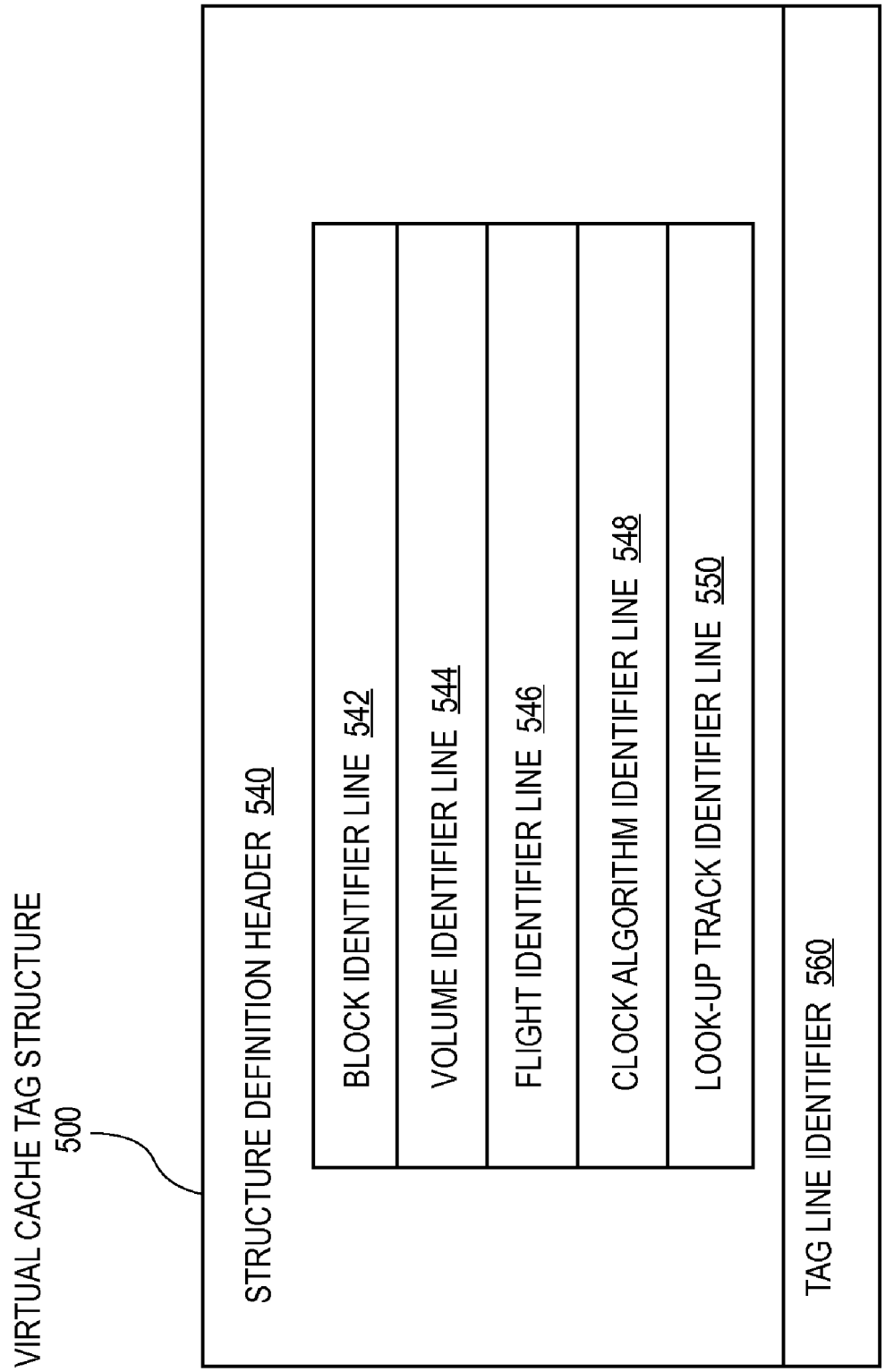
FIG. 5 shows a virtual cache memory data block tag structure, in accordance with an embodiment of the invention.

For example, FIG. 5 shows a virtual cache memory data block tag structure, in accordance with an embodiment of the invention. FIG. 5 shows virtual cache tag structure 500 including structure definition header line 540, block identifier line 542, volume identifier line 544, flight identifier line 546, clock algorithm identifier line 548, look-up track identifier line 550, and tag line identifier 560. Tags 350 of FIG. 3 may be tags, each implementing tag structure 500.

Each tag of tags 350, created at operation 490, or associated with structure 500 may be described as a data structure that can be stored in a simple array or sequential order. According to some embodiments, a virtual cache memory data block tag structure may include more or less lines or information than that shown in FIG. 5. For instance, a virtual cache tag structure may be used for tags 350 that includes less than all of lines 540-560, and/or that includes lines other than those shown for lines 540-560.

Also, virtual cache 306 may implement a set-associative cache and use a 2-handed clock algorithm for insertion/eviction of data blocks into/from the virtual cache. Some bits of each tag of tags 350 may not be used. Also, one of the bits of each tag can be used to lock the block (e.g., so it can not be written over) in virtual cache represented by the tag when inputs/outputs (IOs) are in flight (e.g., when IOs are occurring), and another bit can be used to set the "USED" bit for the 2-handed clock algorithm. However, in cases where IO is not asynchronous, the bit to lock the block may not be necessary. If a non-LRU caching algorithm is used, the "USED" bit may not be relevant.

Since the blocks of data are not actually stored in virtual cache memory (e.g., for quick read and write access to data frequently or recently used) those blocks may be accessed by reading the data from a storage subsystem (e.g., discs 150). For instance, whether or not a lookup request finds data block tags for data inserted but not yet evicted from victim cache memory (e.g., blocks "stored" in memory 306), the block of data may be accessed from a storage subsystem, in either case (e.g., similar to accessing a block of data from a storage subsystem as described above with respect to operation 410).

Of course, when the virtual cache memory becomes full of the virtually cached copies of user data, a LRU or similar eviction algorithm may be employed to determine which virtual cached data to evict, remove or discard (e.g., see operation 495) to make room for the new data (e.g., removed by removing the virtual cache data block tag). For example, at operation 495, blocks of data are "evicted" from the virtual cache. For example, operation 495 may include an eviction algorithm causing or selecting one or more blocks of data to be "evicted" from the virtual cache memory (e.g., memory 306). Operation 495 may include identifying blocks of data (e.g., from blocks 362, 364, and/or 366) to be evicted from portions of storage 360 (e.g., portions P1, P2, and/or P3). Thus, blocks of data evicted from virtual cache at operation 440 may no longer exist in, be found in, be located in, or be able to be successfully looked up in the virtual cache memory (e.g., a look-up request will be unsuccessful in looking these blocks of data up in memory 306). The tags corresponding to the block or blocks of memory evicted at block may be evicted, written over, or deleted from virtual cache tags 350, thus terminating the existence of or "evicting" the block(s) corresponding to that tag from a virtual cache memory (e.g., virtual cache memory 306). The data blocks to be "evicted" at operation 495 may be identified by their virtual cache tags (e.g., tags 350).

In some cases, evicting or removing blocks of data from virtual cache memory at operation 495 may only require writing over, discarding, removing, or deleting the victim cache tag corresponding to the "inserted" or "stored" blocks of data to be evicted. In other cases, evicting blocks of data from the virtual cache may include evicting the tag as well as other actions, such as updating counters, and/or modifying, adding, or deleting data at other locations of main memory 220.

As noted above, it is contemplated that embodiments may exclude a victim cache memory. In such embodiments, operations 450, 460, and 470 are not necessary. Instead, data evicted from buffer cache at operation 440 is inserted into virtual cache at operation 480. Also, in some cases, operations 420 and 430 may be reversed in sequence. Likewise, operations 450 and 460; and/or 480 and 490 may be reversed in sequence.

The insertion and eviction algorithms which may be used in implementing the technique being introduced here (e.g., for FIG. 4) include those known in the art, such as "waterfall scheme" buffer cache algorithms. The following is a list of references to example algorithms which may be used in implementing this technique: 1) P. J. Denning, "Working sets past and present", IEEE Trans Software Engineering, vol. SE-6, no 1, pp 87-95, 1981; 2) W. R. Carr and J. L. Hennessy, "WSCLOCK—a simple and effective algorithm for virtual memory management," in Proc. Eighth Sump. Operating System Principles, pp 87-95, 1981; 3) E. J., O'Neil, P. E. O'Neil and G. Weikum. "The lru-k page replacement algorithm for database disk buffering", Proc. 1993 ACL Sigmod International Conference on Management of Data, pp 297-306, 1993; 4) T. Johnson and D. Shasha, "2Q: A low overhead high performance buffer management replacement algorithm," Proc. VLDB Conf., pp 297-306, 1994; 5) D. Lee, J. Choi, J-H Kim, S. H. Noh, S. L. Min, Y. Cho and C. S. Kim, "LRFU: A spectrum of policies that subsumes the least recently used and least frequently used policies," IEEE Trans. Computers, vol. 50, no 12, pp 1352-1360, 2001; 6) S. Jiang and X. Zhang, "LIRS: An efficient low inter-reference recency set replacement policy to improve buffer cache performance," Proc. ACM SIGMETRICS Conf, 2002; 7) N Megiddo, D. S. Modha, "ARC: A self-tuning, low overhead replacement cache", USENIX File & Storage Technologies Conf. (FAST), 2003; and 8) Y. Zhou and J. F. Philbin, "The multi-queue replacement algorithm for second level buffer caches", Proc. USENIX Annual Tech. Conf. (USENIX 2001), pp 91-104, 2001. The concepts described herein may apply to other algorithms as well.

It can be appreciated that functions of process 400, and blocks therein, may be performed by an insertion algorithm and/or eviction algorithm, or one or more other algorithms stored in memory 220, and/or part of operating system 225, a filer application, and/or another application. Moreover, such an insertion algorithm and/or eviction algorithm may be analyzed and dynamically updated according to counters associated with look-up requests to data block tags corresponding to blocks of data stored in the cache memory described above.

Specifically, it is possible to dynamically analyze buffer, victim, and/or virtual cache memory use according to counters associated with look-up request to look up data block tags corresponding to blocks of data inserted or "stored" in the buffer, victim, and/or virtual cache memory. Likewise, it is possible to determine or dynamically update cache memory related parameters according to the dynamical analysis. For example, during analysis or update, cache related parameters or statistics associated with such dynamic analysis parameters may be derived from the counters.

Furthermore, after dynamically analyzing look-up requests, dynamically updating an algorithm, and/or determining an optimal cache size, a block of data corresponding to a tag looked up by a look-up request from a cache look-up algorithm (e.g., the look-up request that causes or is prior to the dynamic analysis, dynamic update, or selection of optimal cache size) may be accessed from cache memory (e.g., buffer cache or victim cache) or from a storage subsystem (e.g., disks 150). For instance, for a look-up request that successfully looks up a block of data corresponding to a tag (e.g., such as by identifying the tag corresponding to the block of data) or for a counter associated with the tag (e.g., the tag associated with the block of data looked up), the data may be accessed from cache memory or a storage subsystem depending on the type of tag successfully looked up or associated with the counter. If the block of data is associated with a buffer cache tag (e.g., tags 310) or victim cache tag (e.g., tags 330), the block of data corresponding to the tag may be accessed from cache memory (e.g., buffer cache storage 320 or victim cache memory 330, respectively).

Alternatively, if the block of data corresponds to a virtual cache tag (e.g., tags 350), the block of data corresponding to the tag may be accessed from a storage subsystem, as described above, since the block of data may not be stored in virtual cache memory (e.g., memory 360) because virtual cache memory is a virtual memory and does not actually store blocks of data. Thus, for a block of data associated with a virtual cache tag, after dynamically analyzing, such as updating a counter, updating statistics, and/or updating information relating to the look-up of the virtual cache block or corresponding tag, a processor (processors 210) or operating system (e.g., operating system 225) may access (e.g., such as by subsequently looking up and retrieving or reading) a block of data corresponding to the virtual cache tag in a storage subsystem (e.g., such as disks 150) prior to receiving a subsequent look-up request for data from the cache memory (e.g., from memory 320, 330, or 360).

The process of performing, analyzing, updating, or selecting while look-up requests are being received in the cache memory may be described as "dynamically analyzing", dynamically updating", or "dynamically selecting". Moreover, the process of dynamically analyzing, dynamically updating, or dynamically selecting followed by accessing the block of data corresponding to the tag of a look-up request from cache memory or a storage subsystem may be what defines the analyzing, updating, or selecting as dynamic.

Figure 6:
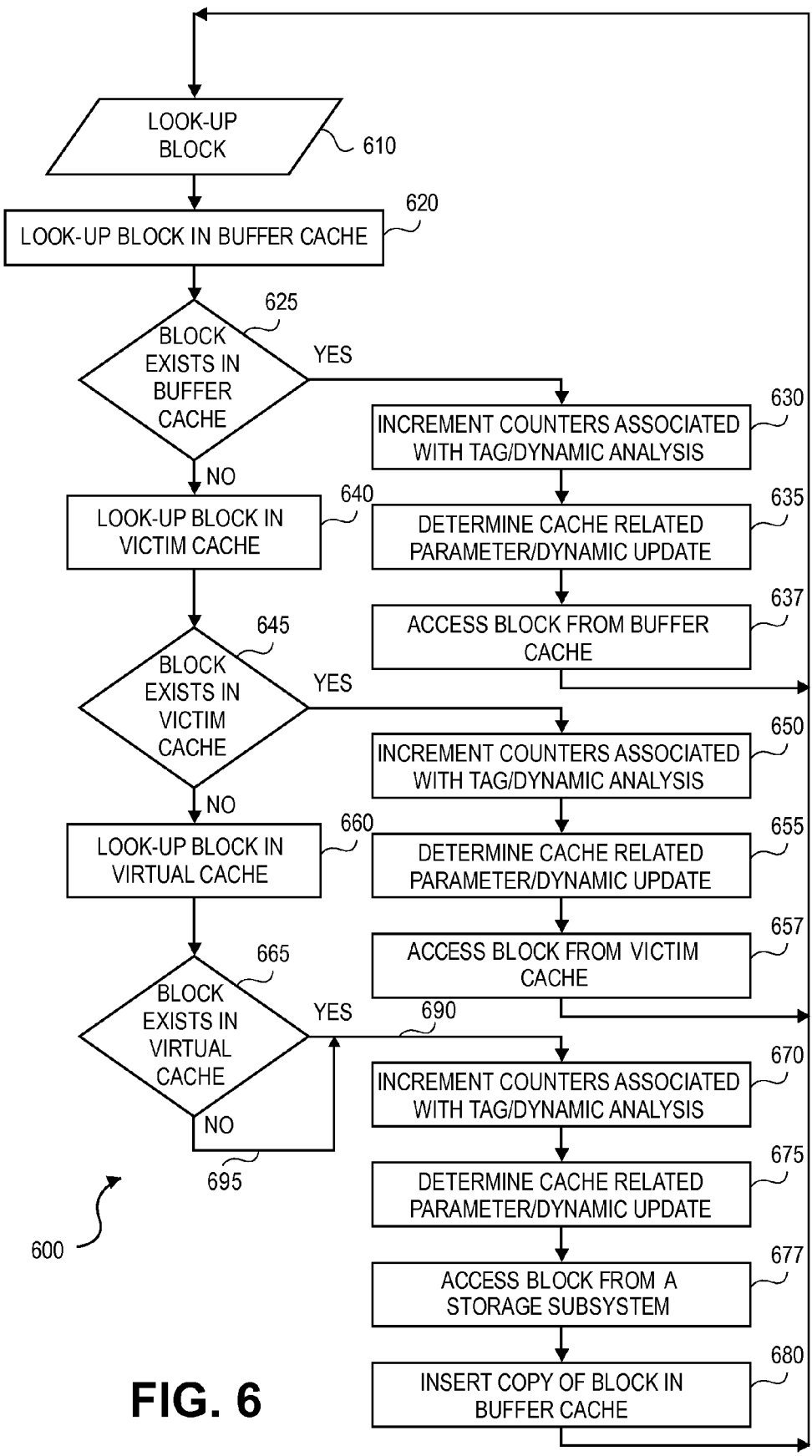
FIG. 6 is a flow diagram of a process for dynamically analyzing cache memory use and dynamically updating cache memory related parameters, in accordance with an embodiment of the invention.

For example, FIG. 6 is a flow diagram of a process for dynamically analyzing cache memory use and dynamically updating cache memory related parameters, in accordance with an embodiment of the invention. FIG. 6 shows process 600, which may be a process for looking up tags corresponding to blocks inserted into a cache memory (such as by locating blocks of data in cache memories), dynamically analyzing cache memory use according to the look-ups, and dynamically updating cache related parameters according to the look-ups.

At operation 610, a block of data is to be looked up. Operation 610 may correspond to a look-up algorithm looking up a block of data in cache memory. After operation 610, processing continues to operation 620.

At operation 620, a block of data is looked up in the buffer cache. Operation 620 may correspond to a look-up algorithm determining whether or not a block of data exists in buffer cache memory (e.g., memory 320, such as by existing in blocks 325). It may be determined whether the block of data exists in a buffer cache by looking up or identifying the blocks looked-up according to that block's corresponding buffer cache tag (e.g., tags 310).

At operation 625, it is determined whether or not the block exists in the buffer cache memory. Operation 625 may correspond to a look-up algorithm determining whether or not the look-up was successful as described above, to look the block up in the buffer cache. If at operation 625 the block does not exist in the buffer cache, processing continues to operation 640.

Moreover, operations 620 and 625 may be a process for looking up blocks of data from buffer cache memory 302, such as according to a look-up algorithm which may be stored in memory 220, part of operating system 225, part of a filer application, and/or part of another software application.

Looking up data in cache memory at operations 620 and 625 may include locating, finding a beginning address of, determining whether data is stored in, determining whether data exists in, or otherwise identifying or locating one or more blocks of data in cache memory. For instance, data may be successfully looked up in a cache memory if the data has been inserted into the memory and has not been evicted, (e.g., the data "exists" there). Thus, data inserted into a virtual cache memory, but not evicted therefrom, even though that data is not actually stored in the virtual cache memory, may be successfully located there, such as by locating the tag corresponding to such blocks of data. Alternatively, a data look-up may not be successful if the data has not been inserted into the cache memory it is being looked up in, has been evicted from that cache memory, written over in that cache memory, or is no longer stored in that cache memory.

Dynamic Analysis

Alternatively, if at operation 625 it is determined that the block does exist in buffer cache, processing continues to operation 630. At operation 630, counters associated with the tag corresponding to the block are incremented and/or dynamic analysis is performed. Operation 630 may include creating, incrementing, and/or updating one or more counters associated with a tag corresponding to a block of data successfully located in the buffer cache according to an analysis software application. Operation 630 may include dynamic analysis of look-up requests, counters (e.g., counters as described below with respect to FIG. 7), and/or cache memory usage as described herein. For instance, dynamically analyzing at operation 630 may include performing cache usage and other analysis as known in the industry, dynamically or on a dynamic basis (e.g., analysis that is not performed dynamically in the industry, may be performed dynamically at operation 630). However, dynamically analyzing at operation 630 is not limited to dynamically performing cache usage and other analysis known in the industry.

In some cases, dynamically analyzing at operation 630 may include determining a hit/miss ratio according to or defined as a ratio of a number of successful look-up requests, and a number of unsuccessful look-up requests. A successful look-up request may be considered where a tag is found or exists, such as a tag corresponding to a block or data previously inserted into a cache memory but not yet evicted from that cache memory. An unsuccessful look-up request may be described as a look-up request for a tag that is not found or does not exist, such as a tag corresponding to a block of data previously inserted and previously evicted from a cache memory. Specifically, for a buffer cache or victim cache, both the tag and the data block corresponding to the tag may exist for a successful look-up request. Alternatively, for a virtual cache memory, the tag may exist, but the block of data corresponding to the tag may not. On the other hand, neither the tag nor the block of data exists in a buffer cache, victim cache, or virtual cache for an unsuccessful look-up. It can be appreciated that the hit/miss ratio will change over time, but may be a single ratio at a point in time, such as after one look-up is found to be successful or unsuccessful, and before receiving the next look-up or determining whether the next look-up is successful or unsuccessful.

Dynamically analyzing at operation 630 may also include counting a number of tags corresponding to a metadata block of data, and counting a number of tags corresponding to a normal data block of data. Counting the number of tags may include determining whether the tags exist, or identifying tags corresponding to the types of blocks of data, where the types are metadata and normal data. A metadata block may be a block of data created by the operating system to manage user data. A normal data block may be defined as a block of data containing user data. It can be appreciated that the number of tags corresponding to metadata blocks and normal data blocks will change over time, but may be defined as a single number at a point of time, such as between look-up requests, insertions, and/or evictions.

It is also considered that dynamically analyzing at operation 630 may include determining a percentage of the total data storage size of a cache memory that has blocks of data "stored" there. For instance, such a percentage may be a percentage of the total data storage size (e.g., size of storage 320, 340, and/or 360) having blocks of data "stored" therein (e.g., size of blocks 325, 345, and/or 362-366). The blocks "stored" in a virtual cache may be defined by a sum of data sizes of blocks of data corresponding to the tags of the virtual cache memory (e.g., tags 350) although the blocks inserted are not stored in the virtual cache memory. It can be appreciated that the percentage of the total data storage size will change over time, but may be defined as a single number at a point of time, such as between look-up requests, insertions, and/or evictions.

Likewise, dynamically analyzing at operation 630 may include counting a number of look-up requests for each cache memory tag over a period of time. For instance, such a count may be a number of look-up requests to look up data blocks corresponding to cache memory tags (e.g., tags 350, although the blocks inserted are not stored in the virtual cache memory). It can be appreciated that the number of look-up requests for each cache memory tag will change over time, but may be defined as a single number at a point of time, such as between look-up requests, insertions, and/or evictions. In some cases, a data block having a number of look-up requests over time that is greater than a threshold number, may be defined as a "hot" block. For instance, a hot block may have seven or more look-ups at any point in time.

Similarly, dynamically analyzing at operation 630 may include counting a total number of look-up requests for all the tags of a cache memory over a period of time. For instance, such a count may be a total number of look-up requests to look up all data blocks corresponding to all cache memory tags (e.g., all of tags 350, although the blocks inserted are not stored in the virtual cache memory). It can be appreciated that the total number of look-up requests for all the tags of a cache memory will change over time, but may be defined as a single number at a point of time, such as between look-up requests, insertions, and/or evictions.

In some cases, dynamically analyzing at operation 630 may include determining a working set size of the number of blocks or tags of a cache memory that have been looked-up at least a selected threshold number of times. For instance, such a working set size may be a size of the total data storage size (e.g., size of storage 320, 340, and/or 360) of blocks of data having a number of look-up requests equal to or greater than one (or another threshold number). The working set size may correspond to blocks "stored" in a virtual cache memory corresponding to the tags of the virtual cache memory (e.g., tags 350) having a number of look-up requests equal to or greater than one, although the blocks inserted are not stored in the virtual cache memory. It can be appreciated that the working set size will change over time, but may be defined as a single number at a point of time, such as between look-up requests, insertions, and/or evictions.

Dynamic Updates

After operation 630, processing continues to operation 635. At operation 635, a cache-related parameter is determined and/or dynamic updating is performed. Operation 635 may include dynamically creating and/or updating a statistic related to a cache-related parameter. Operation 635 may include dynamically updating a cache related parameter and/or algorithm, such as an insertion and/or eviction algorithm, based on the dynamic analysis of operation 630. For example, based on the counters and/or dynamic analysis of operation 630, a maximum cache data storage size, performance analysis, workload analysis, coredump analysis, or other cache related parameter or algorithm may be dynamically updated. Determining a cache related parameter at operation 635 may include determining a cache related parameter, as known in the industry, dynamically or on a dynamic basis. For instance, operation 635 may include determining a cache related parameter, as known in the industry, based on dynamic analysis (e.g., a parameter that is not dynamically determined in the industry, may be determined dynamically at operation 635). However, dynamically updating at operation 635 is not limited to dynamically updating or determining a cache related parameter known in the industry. Cache related parameters may be dynamically determined, dynamically analyzed and/or dynamically updated, such as based on, considering, or according to dynamic analysis of look-up requests, counters (e.g., counters as described below with respect to FIG. 7), and/or cache memory usage as described herein.

Cache related parameters contemplated herein include cache data storage size, cache insertion algorithms, cache look-up algorithms, cache eviction algorithms, and/or cache related parameters as known in the art. Cache related parameters may also include cache policies (e.g., buffer cache policies) related to insertion (e.g., where and when data enters the cache memory), aging (e.g., figuring out how long a block of data has been "stored" or resided in a cache memory as compared to other blocks of data in that cache memory), eviction (e.g., picking a victim block of data to evict from a cache memory when there is no space available in that cache memory for inserting a new block of data), and/or pollution avoidance (e.g., ensuring that "bad" data (e.g., data that is temporary and/or has a fluctuating workload) does not replace "good" data (e.g., data that in a regular or steady state) in that cache memory).

Likewise, cache related parameters may include performance analysis, workload analysis, and coredump analysis, as known in the art. For example, tags 150 may be used to represent virtual blocks in storage 360 during a coredump analysis when a computing system having the virtual cache memory crashes. After the crash, the contents of main memory 220 may be saved in a "corefile". Since tags 350 reside in main memory 220, the tags may contain useful information about recently evicted blocks (e.g. evicted from cache memory 302 and/or 304). Thus, tags 350 may provide information that helps determine or solve the issue causing the crash (e.g., such as data corruption issues) by providing a history of the computing system execution or actions that extends further back in time than data cached in just the buffer cache, or in the buffer and victim cache. It is considered that cache related parameters may also include parameters with respect to a virtual cache as well as a buffer cache, and/or victim cache.

Cache data storage size may describe a total maximum data storage size of a cache for storing cache blocks, such as a total storage size reserved for storage 320, plus storage 340, plus storage 360 (e.g., where storage 360 may include the storage size of portion P1; P1 plus portion P2; or portion P1 plus portion P2 plus portion P3), as described above with respect to FIG. 3. According to embodiments, a cache-related parameter may be described as determining an optimal cache data storage size of a cache memory (e.g., such as a maximum data storage size of a victim cache and/or buffer cache memory) to store blocks of data, an optimal cache data insertion algorithm to insert data into one or more cache memories (e.g., such as a virtual cache and/or buffer cache) and/or an optimal cache data eviction algorithm to evict data from one or more cache memories (e.g., such as a victim cache and/or buffer cache). It is also considered that a total data storage size may be defined for a virtual cache memory, such as a data size of blocks of data inserted into the virtual cache and corresponding to existing virtual cache tags (e.g., virtual cache tags 350). This total data storage size may be selected, change over time, or defined as a maximum size associated with the size of another cache memory, such as the victim cache and/or buffer cache. As noted above for FIG. 3, the total data storage size of a virtual cache memory may be a fraction, a multiple, and/or combination thereof of the total data storage size of the buffer cache or total data storage size of the buffer cache plus the victim cache.

In addition, determining cache related parameters may include determining those parameters considering the hit/miss ratio, determining whether tags correspond to metadata blocks or normal data blocks, determining a percentage of a cache memory (e.g., victim cache memory 306), maximum data storage size being used to store blocks corresponding to tags, determining a number of look-up requests for each tag over a period of time, counting a total number of look-up requests for tags for a portion or all of a cache memory over a period of time, determining a working set size of a cache memory (e.g., as described above for operation 630) as factors to be considered, accounted for and/or balanced between to determine a cache related parameter and/or parameter update (e.g., such as an optimal insertion algorithm, optimal eviction algorithm, and/or optimal cache size) (e.g., at operation 635). Specifically, it may be desirable to decrease the hit/miss ratio in the virtual cache, reduce the number of metadata blocks in the virtual cache, reduce the percentage of "hot" data in the victim cache (e.g., "hot" data identified as data for which a number of look-up requests over a period of time exceeds a threshold value).

For instance, the size of the victim cache memory and/or buffer cache memory may be increased by a size equal to the data storage size of portion P1; portion P1 plus portion P2; or portion P1 plus portion P2 plus portion P3 in order to achieve one or more of the above-identified goals. As noted above with respect to FIG. 3 and virtual cache memory 306, use of portion P1, P2, and/or P3 may describe a cascaded virtual cache memory, such as for use to optimize cache memory size. Similarly, the eviction algorithm and/or insertion algorithm may be changed to achieve one or more of the above-identified goals. According to some embodiments, increasing or updating counters, dynamically analyzing, determining a cache related parameter, and/or dynamically updating a cache related algorithm may be based on updates to counters and/or analyzing look-up requests that are not performed dynamically. For example, updates to counters and/or analysis performed based on data gathered from computing devices, such as servers, received over a network (e.g., such as by email) may be performed, and determination of cache related parameters, updates of cache related algorithms, and/or dynamic updating may be performed using data derived therefrom (e.g., such as according to factors identified above).

In some cases, the consideration, balancing, and/or factors considered may be performed by a person or a machine, according to criteria, requirements, and/or motivations, as known in the industry. For example, one or more factors described may be considered to determine a cache related parameter in order to provide optimum performance, which may be balanced against the cost of providing performance increases up to and including an analyzing optimal performance (e.g., a cost to a customer, such as to increase the size of a buffer cache memory).

It can be appreciated that a virtual cache provides dynamic analysis, determination of cache related parameters, and/or dynamic updating of cache related algorithms or parameters for one or more cache memory sizes greater than the size of a buffer cache, or a buffer and victim cache without requiring the expense of using and/or incorporating actual hardware for memory address space to save the blocks of data inserted into the virtual cache memory. For instance, a virtual cache or cascaded virtual cache as described herein allows for these analysis, determining and updating requiring memory only to store the virtual cache tags, which requires substantially less storage space than storing the actual data block corresponding to those tags (and less space than storing buffer cache tags, as noted above for FIG. 3).

Alternatively, according to some embodiments, instead of a virtual cache memory, actual cache memory may be used to provide for dynamic analysis, determining of cache related parameters, and/or dynamic updating of cache related parameters and/or algorithms, as described herein. In some of these embodiments, an actual cache memory or cascaded actual cache memory may be used in place of the virtual cache or virtual cascaded cache. In these embodiments, the blocks of data corresponding to tags of this actual cache memory may be accessed from the actual cache memory. For instance, it may not be necessary to access blocks of data found in the actual cache memory from a storage subsystem (e.g., operation 677 of FIG. 6 will access the block from the actual cache memory, and operation 680 will be unnecessary).

It can be appreciated that such actual cache memory embodiments (in place of a virtual cache memory) may use data block tags similar to those described or known for a buffer cache memory, thereby providing advantages or increased information for dynamic analysis, determination of cache related parameters and/or updating of cache related parameters and/or algorithms. On the other hand, use of a virtual cache memory has the advantage of requiring less actual memory storage space and may provide for increased performance of the cache memory, such as in cases where the size of the buffer cache, or buffer cache and victim cache is an optimal cache size for the computing system (e.g., server 140).

For example, an optimal cache size may include increasing the current cache size (e.g., buffer cache, or buffer and victim cache) by a data storage capacity of between 512 Mega-Bytes and 8 Giga-Bytes (e.g., where the increase of size corresponds to the data storage capacity of portion P1; portion P1 plus portion P2; or portion P1 plus portion P2 plus Portion P3). It can be appreciated that the actual physical memory total data storage size for a virtual cache memory (e.g., storage footprint) may be only the size required or reserved to store virtual cache tags (e.g., virtual cache tags 350) since blocks of data inserted into the virtual cache are not stored in the virtual cache memory.

At operation 637, the block of data successfully looked up in the buffer cache is accessed from the buffer cache. Operation 637 may include a processor retrieving the data on behalf of server 140, or a client processing system.

At operation 640, a block of data is looked up in the victim cache. Operation 640 may correspond to a look-up algorithm determining whether or not a block of data exists in victim cache memory (e.g., memory 304, such as by existing in blocks 345). It may be determined whether the block of data exists in a victim cache by looking up or identifying the blocks looked-up according to that block's corresponding victim cache tag (e.g., tags 330).

At operation 645, it is determined whether or not the block exists in the victim cache memory. Operation 645 may correspond to a look-up algorithm determining whether or not the look-up was successful as described above, to look the block up in the victim cache. If at operation 645 the block does not exist in the victim cache, processing continues to operation 660.

Moreover, operations 640 and 645 may be a process for looking up blocks of data from victim cache memory 304, such as according to a look-up algorithm which may be stored in memory 220, part of operating system 225, part of a filer application, and/or part of another software application. Looking up and determining whether blocks of data exist at operations 640 and 645 may including descriptions above for looking up data in cache memory for operations 620 and 625.

Alternatively, if at operation 645 it is determined that the block does exist in victim cache, processing continues to operation 650. At operation 650, counters associated with the tag corresponding to the block are incremented and/or dynamic analysis is performed. Operation 650 may include creating, incrementing, and/or updating one or more counters associated with a victim cache tag corresponding to a block of data successfully located in the victim cache according to an analysis software application. Dynamic incrementing of counters or analysis at operation 650 may include descriptions above for operation 630. Operation 650 may also include dynamic analysis of look-up requests, counters (e.g., counters as described below with respect to FIG. 7), and/or cache memory usage as described herein. Dynamically analyzing at operation 650 may include performing cache usage and other analysis, as known in the industry, dynamically or on a dynamic basis (e.g., analysis that is not performed dynamically in the industry, may be performed dynamically at operation 650). However, operation 650 is not limited to performing cache usage or other analysis known in the industry.

After operation 650, processing continues to operation 655. At operation 655, a cache-related parameter is determined and/or dynamic updating is performed. Operation 655 may include dynamically creating and/or updating a statistic related to a cache-related parameter. Operation 655 may include dynamically updating a cache related parameter and/or algorithm, such as an insertion and/or eviction algorithm, based on the dynamic analysis of operation 650. Dynamic determining cache related parameters, and dynamic update at operation 655 may include descriptions above for operation 635. For example, based on the counters and/or dynamic analysis at operation 650, a maximum cache data storage size, performance analysis, workload analysis, coredump analysis, or other cache related parameter or algorithm may be dynamically updated. Determining a cache related parameter at operation 655 may include determining a cache related parameter, as known in the industry, based on dynamic analysis. For instance, operation 655 may include determining a cache related parameter, as known in the industry, based on dynamic analysis (e.g., a parameter that is not dynamically determined in the industry, may be determined dynamically at operation 655). However, dynamically updating at operation 655 is not limited to dynamically updating or determining a cache related parameter known in the industry.

At operation 657, the block of data successfully looked up in the victim cache is accessed from the victim cache. Operation 657 may include a processor retrieving the data on behalf of server 140, or a client processing system.

At operation 660, a block of data is looked up in the virtual cache. Operation 660 may correspond to a look-up algorithm determining whether or not a block of data exists in virtual cache memory (e.g., memory 306, such as by existing in blocks 362-366). It may be determined whether the block of data exists in a virtual cache by looking up or identifying the blocks looked-up according to that block's corresponding virtual cache tag (e.g., tags 350).

At operation 665, it is determined whether or not the block exists in the virtual cache memory. Operation 665 may correspond to a look-up algorithm determining whether or not the look-up was successful as described above, to look the block up in the virtual cache.

Moreover, operations 660 and 665 may be a process for looking up blocks of data from virtual cache memory 306, such as according to a look-up algorithm which may be stored in memory 220, part of operating system 225, part of a filer application, and/or part of another software application. Looking up and determining whether blocks of data exist at operations 660 and 665 may including descriptions above for looking up data in cache memory for operations 620 and 625.

If at operation 665 the block does not exist in the virtual cache, processing continues to operation 670 by path 695, where performance of operations 670-680 considers that at operation 665 the block of data does not exist in the virtual cache, as will be described further below. For instance, in this case, operation 677 is performed, because the data can not be accessed from virtual cache memory, since the virtual blocks are not found there (e.g., they have not been inserted or have been evicted from virtual cache memory).

Also, if at operation 665 it is determined that the block does exist in virtual cache, processing continues to operation 670 by path 690, where performance of operations 670-680 considers that at operation 665 the block of data does exist in the virtual cache. For instance, in this case, operation 677 is performed, because the data can not be accessed from virtual cache memory, since the virtual blocks are not actually stored.

At operation 670, counters associated with the tag corresponding to the block are incremented and/or dynamic analysis is performed. Operation 670 may include creating, incrementing, and/or updating one or more counters associated with a virtual cache tag corresponding to a block of data successfully located in the virtual cache according to an analysis software application. Dynamic incrementing of counters or analysis at operation 670 may include descriptions above for operation 630. Operation 670 may also include dynamic analysis of look-up requests, counters (e.g., counters as described below with respect to FIG. 7), and/or cache memory usage as described herein. For instance, dynamically analyzing at operation 670 may include performing cache usage and other analysis, as known in the industry, dynamically or on a dynamic basis (e.g., analysis that is not performed dynamically in the industry or with respect to virtual cache, may be performed dynamically at operation 670). However, operation 670 is not limited to performing cache usage or other analysis known in the industry.

After operation 670, processing continues to operation 675. At operation 675, a cache-related parameter is determined and/or dynamic updating is performed. Operation 675 may include dynamically creating and/or updating a statistic related to a cache-related parameter. Operation 675 may include dynamically updating a cache related parameter and/or algorithm, such as an insertion and/or eviction algorithm, based on the dynamic analysis of operation 670. Dynamic determining cache related parameters, and dynamic update at operation 675 may include descriptions above for operation 635. For example, based on the counters and/or dynamic analysis at operation 670, a maximum cache data storage size, performance analysis, workload analysis, coredump analysis, or other cache related parameter or algorithm may be dynamically updated. Determining a cache related parameter at operation 675 may include determining a cache related parameter, as known in the industry, based on dynamic analysis. For instance, operation 675 may include determining a cache related parameter, as known in the industry, based on dynamic analysis (e.g., a parameter that is not dynamically determined in the industry, may be determined dynamically at operation 675). However, dynamically updating at operation 655 is not limited to dynamically updating or determining a cache related parameter known in the industry.

In some embodiments, determining a cache related parameter or dynamically updating at operations 635, 655, and/or 675 may include selecting, altering, or changing a maximum data storage size of a virtual cache memory (e.g., memory 306, such as by reserving more space memory for tags 350). For example, a maximum data storage capacity of memory 306, storage 360, and/or portions thereof may increased or decreased according the increment of counters and/or dynamic analysis at operations 630, 650, and 670, respectively. In some cases, the maximum data storage size of a virtual cache memory and/or portion sizes for a cascaded virtual cache memory may be updated to provide analysis, determining and updating for more optimal cache sizes (e.g., including the size of the virtual cache memory) than prior to the updated memory and/or portion sizes.

At operation 677, the block of data is accessed from a storage subsystem. Operation 677 may include a processor accessing the data or retrieving the data on behalf of server 140 or a client processing system from a storage subsystem such as disk 150. For instance, accessing from a storage subsystem at operation 677 may include descriptions above with respect to operation 410 of FIG. 4, and accessing blocks of data corresponding to virtual cache tags as described above at FIGS. 3 and 4.

Whether or not at operation 665 the block of data exist in the virtual cache memory, since the data is not stored or does not exist in that memory, it may be accessed elsewhere. For instance, at operation 677 the data will be accessed from a storage subsystem. It can be appreciated that if a look-up request finds a tag corresponding to a block of data inserted into virtual cache memory, the virtual block of data is not saved in cache memory. Thus, it may be necessary for a processor or operating system to access the block of data (e.g., even though it has been "found" to exist in the virtual cache memory at operation 665) from memory other than cache memory, such as by accessing the block of data from a storage subsystem. Specifically, operation 410 of FIG. 4 may describe looking up or accessing a block of data (e.g., operation 677) from a storage subsystem, where that block of data corresponds to a virtual cache memory tag found at operation 665.

Likewise, if a block of data is not found in the cache memory (e.g., it does not exist at operation 665), it may not have been found in any cache memory, since a look-up algorithm would typically start with looking up the block in the buffer cache, then go to the victim cache, then go to the virtual cache. Thus, again, it may be possible to access the data from a storage subsystem. The access of the block of data from a storage subsystem, in either case, may be similar to accessing a block of data from a storage subsystem as described above with respect to operation 410 of FIG. 4.

At operation 680, a copy of the blocks of data accessed at operation 677 is stored in a buffer cache memory. Operation 680 may include storing blocks of data accessed from a storage subsystem as described above with respect to tags 310 and storage 320 of FIG. 3; and/or operations 420 and 430 of FIG. 4.

In addition, operations 677 and/or 680 may include increasing a priority value of one or more blocks of data accessed from a storage subsystem, where the priority value is a value in a priority hierarchy, such as a hierarchy where blocks with a priority below threshold value are eligible for eviction from the buffer cache memory. The priority of the block of data corresponding to the virtual cache tag of a block of data existing at operation 665 may be increased after accessing the block of data from a storage subsystem. For example, increasing priority may include increasing by one or more steps or points in priority of a hierarchical priority scheme in which a block with a priority below a selected threshold is eligible for eviction. The increase in priority may be in terms of points of a point scale, such as by increasing the priority by a value of 1 in a scale from 1 to 7. The increase in priority may occur prior to accessing the copy of data stored in the buffer cache memory from the buffer cache memory. For instance, the priority of a specific FSID and block number may be increased by one or more points in a priority hierarchy used by an operating system to determine whether blocks of data are to be evicted or purged from buffer cache 302, victim cache 304, and/or virtual cache 306 as described above with respect to FIGS. 3 and 4. The priority hierarchy may include a ranking of priority between 1 and 7, 7 being the highest priority and 1 being the lowest priority, where a block having a priority of one is eligible for eviction.

Moreover, such a priority hierarchy may be part of a hierarchy process that includes increasing the priority of a block by 1 each time a read request for that block is analyzed or counted. Thus, operations 637 and 657 may also include increasing a priority of one or more blocks of data being accessed from buffer cache or victim cache, respectively. According to the hierarchy process, if a block of data is not referenced for a selected period of time, the priority of the block of data may be decreased by one or more points. Priority hierarchies and processes considered include those known in the art, such as those related to priority processes of "waterfall scheme" buffer cache insertion and eviction algorithms (e.g., see cited references above).

Figure 7:
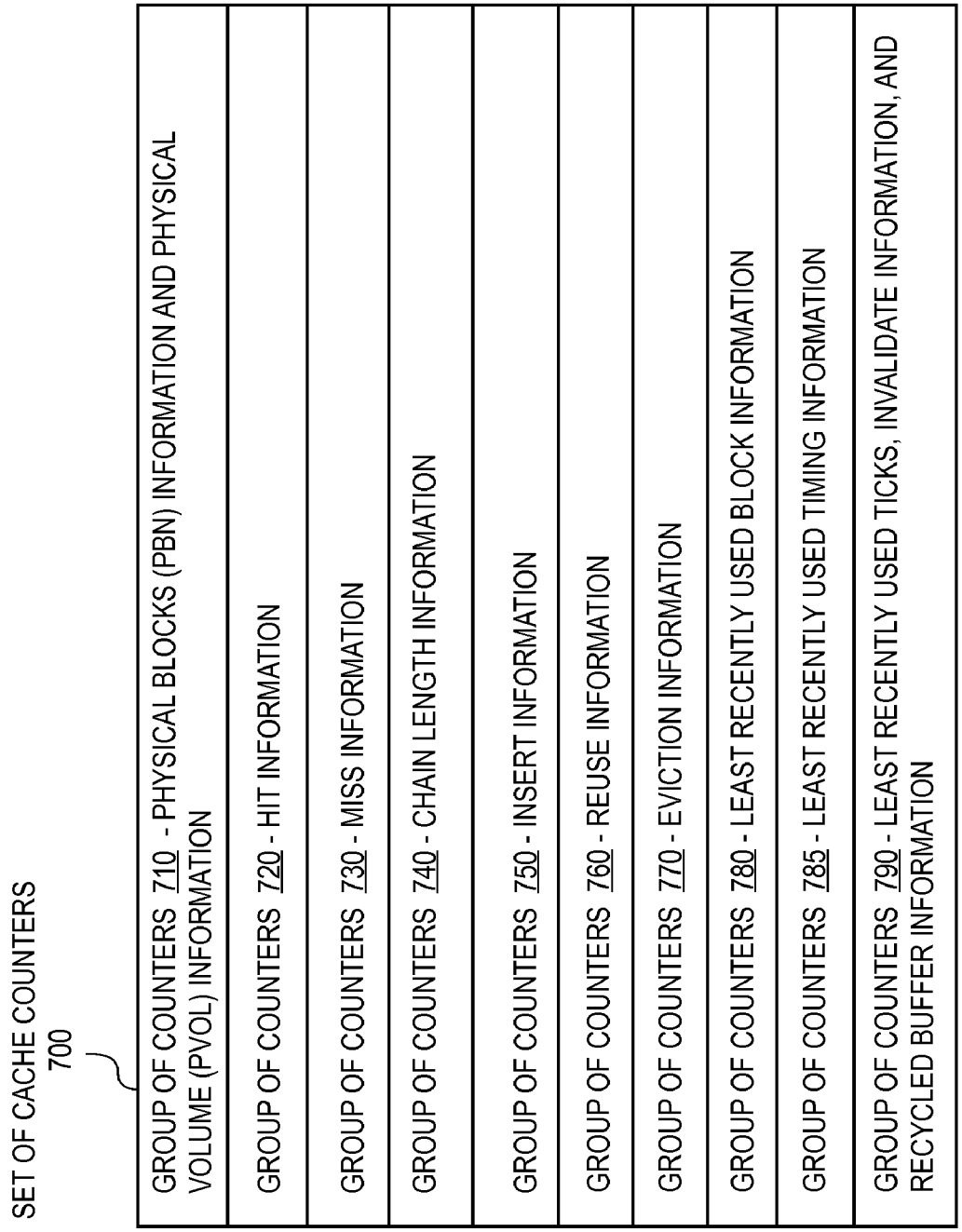
FIG. 7 shows a set of cache counters, in accordance with an embodiment of the invention.

FIG. 7 shows a set of cache counters, in accordance with an embodiment of the invention. Counters of set 700 may be used to optimize cache memory, such as by dynamically or iteratively updating and analyzing counters of set 700 during use of a cache memory (e.g., virtual cache memory 306) for which counters of set 700 are counting "types" of information. FIG. 7 shows set 700 of cache counters, including groups of counters 710, 720, 730, 740, 750, 760, 770, 780, 785, and 790, where each group includes at least one counter, to count one or more "types" of information. A type of information may include counting physical blocks (pbn) information and physical volume (pvol) information; hit information, miss information; chain length information; insert information; reuse information; eviction information; least recently used block, timing, ticks, invalidate, and recycled buffers information. Set 700 may include various counters, each of which may be described as a data structure that can be stored in a simple array or sequential order, such as in memory, and it can be incremented or updated without changing position in the array or sequence. Updating may include performing a mathematical operation on an existing value of a counter, creating a new value to replace an existing value of a counter, and/or a combination thereof. In some cases, dynamically analyzing counts (e.g., counts of set 700 of FIG. 7) and/or look-up requests may include updating counts or statistics based on an initial look-up request according to the cache look-up algorithm, prior to receiving a subsequent data look-up request according to the cache look-up algorithm (e.g., see FIG. 6).

Counters of set 700 could be used to dynamically or iteratively tune customer workloads (as well as standard benchmarks) for better throughput and/or response time characteristics. For instance, counters of set 700 may include standard benchmark counters as known in the industry (but not used to dynamically analyze cache usage, or on virtual cache memory). Such standard counters may have specific metrics (e.g., throughput and/or response time) that are not cache-related counter requirements. In addition, set 700 may include non-standard benchmark counters, such as counters having or not having specific metrics (e.g., throughput and/or response time) and having cache-related counter requirements.

For example, the information dynamically gathered by group 710 by updating one or more counters in group 710 associated with a tag when a look-up request for the tag is received, may be used to dynamically update statistics (see FIG. 6) derived from the counters of group 710 when one or more of those counters is updated. A similar concept applies to groups 720-790. For instance, information from group 710, 720, 750, 780, 785 and/or 790 may reveal a very high rate of hits on metadata blocks with very low insertion rate and that the inter-reference interval is quite small. This may imply that the buffer cache and/or victim cache eviction algorithm may be excessively aggressive in picking out these blocks for eviction. Furthermore, the penalty for not finding these blocks in the buffer and/or victim cache may be higher than the penalty for not finding other kinds of blocks. Thus, it may be advisable to modify the buffer cache and/or victim cache eviction algorithms to bump up the priority for metadata blocks so that the rate at which they are evicted is reduced.

Counters for Dynamic Analysis

Selecting counters for any of groups 710-790 or set 700 may be determined according to an analysis criteria, by an operator of the computing device (e.g., such as server 140), or otherwise by a computing device or person (e.g., such as a person having experience in the field of cache memory design and/or analysis). The hits counted by or associated with counters of set 700 may be hits as described above with respect to successfully locating a block of data corresponding to a tag according to a look-up caused by a look-up algorithm. The misses counted by or associated with counters of set 700 may be misses as described above with respect to unsuccessfully locating a block of data corresponding to a tag according to a look-up caused by a look-up algorithm. The inserts counted by or associated with counters of set 700 may be inserts as described above with respect to FIGS. 3 and 4 and inserting blocks of data into a cache memory according to an insert algorithm. The evictions counted by or associated with counters of set 700 may be evictions as described above at FIGS. 3 and 4 with respect to evicting blocks of data from a cache memory. The blocks and volumes of data counted by or associated with set 700 may be blocks and volumes of data, such as to uniquely identify a block of data, as described above with respect to FIG. 3 (e.g., according to FSID and block number). The LRU counted by or associated with counts of set 700 may be LRU's as described above with respect to FIG. 3. Thus, a look-up request for a tag may be generated according to a look-up algorithm. Such a look-up may be received by processors 210 to look-up data from cache memory stored in memory 220. Counters of set 700 may be stored in memory, such as memory 220, 202, 204 and/or 206.

With respect to counters of set 700, it is possible to use (pvol, pbn) as a hash for identifying a cache set associated with any (pvol, pbn). An example of a hash function, according to an embodiment of the invention may work as known in the industry. Also, it is considered that an appropriate hash function may uniquely map the tuple (pbn, pvol) to a single set.

According to embodiments, set 700 may be counters for each cache memory, such as memory 202, 204 and/or 206 of FIG. 3. Thus, for each memory 202, 204 and/or 206, a set of counters (e.g., set 700) may be incremented to dynamically analyze the various portions of the virtual cache memory, such as to determine a cache memory parameter (e.g., as described above for FIG. 4). Specifically, one or more counters of a set of counters for a cache memory (e.g., updates to one or more counters of set 700) may be incremented or updated based on each look-up request that successfully or unsuccessfully finds a data block (e.g., tag for virtual cache memory) in that cache memory. In any case, a set of counters (e.g., set 700) for each memory 202, 204 and/or 206 may be saved in each corresponding memory, such as memory 202, 204 and/or 206.

Furthermore, according to embodiments, set 700 may be counters for each portion of the virtual cache memory (e.g., see portions P1-P3 of FIG. 3). Thus, for each portion, a set of counters (e.g., set 700) may be incremented to dynamically analyze the various portions of the virtual cache memory, such as to determine a cache memory parameter (e.g., as described above for FIG. 4). Specifically, one or more counters of a set of counters for a portion (e.g., updates to one or more counters of set 700) may be incremented or updated based on each look-up request that successfully or unsuccessfully finds a data block (e.g., tag for virtual cache memory) in that portion. In any case, a set of counters (e.g., set 700) for each portion may be saved in memory, such as memory 220, 202, 204 and/or 206.

Moreover, the dynamic analysis may include combining the count, statistics derived from the counts, and/or analysis derived from the counts of different cache memories and/or portions of virtual cache memory to determine statistics or analysis for different size increases in a buffer cache memory or a buffer cache and victim cache memory configuration. For example, the counts, statistics, or information derived form portion P1 may provide information by increasing the size of a cache memory by size Size1, as shown in FIG. 3. Likewise, combining the counts, statistics derived therefrom, analysis derived therefrom, and/or information derived therefrom for portions P1 and P2 may be combined (such as by a mathematical or statistical operation) or added to determine the impact of increasing the size of a cache memory by size Size2. Likewise, the counts, statistics derived from the counts, analysis derived from the counts, and/or information from portions P1, P2, and P3 may be combined or added to determine the impact of increasing a cache memory by size Size 3.

Thus, a memory having portions as described above with respect to FIG. 3 and counters of FIG. 7 may define or be described as a "cascaded" cache memory, or a cascaded virtual cache memory that provides the capability to analyze, update and/or optimize multiple sized cache memories, by having portions for which counters, analysis derived from the counters, statistics derived from the counters, and/or information derived from the counters (and/or look-up requests for blocks of data inserted into the portions) may be combined to provide information for various size increases of cache memory greater in size than the size of each portion. Specifically, by summing the counts, or information related to look-up requests into the portions, and analysis for increasing the size of a cache memory by the sum of one or more portions of the virtual cache memory may be determined, such as to determine cache memory related parameters.

For example, for a buffer cache memory having storage size X of between 6 and 16 Giga-bytes, portions P1, P2, and P3 may be have a storage sizes of 2×, 4×, and 8× respectively. Thus, an optimal storage size for a cache memory for the computing system (e.g., server 140) may be determined to be X (status quo), 3×, 5×, or 9×. Here it can be appreciated that as opposed to only being able to consider a storage size for X or 9×, by using a cascaded cache, more data points for measurement are provided, such as to track trend lines. In fact, the multiple points provided by the cascaded cache allow for dynamic analysis, dynamic counting, dynamic determining of cache related parameters, and/or dynamic updating of cache related parameters according to curves or trend lines, such as to provide data relevant to cache sizes between and other than just at multiples of X. Specifically, in the example above, such analysis, counting, determining, and updating may be performed for a cache memory having any sizes below, between, or above X, 3×, 5×, or 9×. Moreover, the determination will be much more accurate than in the case of a non-cascaded cache, such as where only X and 9× are considered.

Counters for Dynamic Updates

In addition to dynamically analyzing look-up requests from a cache look-up algorithm, and/or counts, such as those included in set 700 of FIG. 7, cache insertion, eviction, and look-up algorithms may be dynamically updated according to (for example) such dynamic analysis. For example, a cache eviction algorithm to evict, from a cache memory, blocks of data previously inserted into the cache memory may be performed. Such dynamic updating may be based on dynamic analysis of look-up requests from a cache look-up algorithm to look-up data block tags corresponding to blocks of data stored in a cache memory (such as a virtual cache memory, victim cache memory, buffer cache memory, or any combination thereof), and/or dynamic analysis of counters (e.g., updates to counters, such as set 700) based on the look-up requests, as described herein. Specifically, a cache eviction algorithm to evict blocks of data previously inserted into a buffer cache, victim cache, and/or virtual cache memory may be dynamically updated based on dynamic analysis of look-up requests from a cache look-up algorithm to look-up data block tags corresponding to blocks of data inserted into a virtual cache memory. Thus, the dynamic analysis of look-up requests or counters for virtual cache memory tags (e.g., tags 350) may be used to dynamically update a cache eviction algorithm (e.g., such as an LRU algorithm) for evicting memory from a buffer cache memory, victim cache memory, virtual cache memory, or all of those cache memories. It can be appreciated that this includes dynamic analysis of look-up requests and/or counters corresponding to portions of a virtual cache memory. Such dynamic updating may be described as determining a cache memory-related parameter.

According to embodiments of the invention, functions described above for FIGS. 1-7 may be performed by a software application to dynamically analyze cache memory use and/or to dynamically update cache memory related parameters, as described herein. The application may be included, stored, loaded and executed or run in memory 220 as described above with respect to operating system 225 and FIG. 2. The application may be part of operating system 225, a file system, and/or another application. Thus, the application may be a machine accessible medium containing instructions, that when executed, cause a machine to perform the functions described herein (e.g., functions described above for FIGS. 1-7). Specifically, the application (e.g., part of an operating system) may include instructions to dynamically analyze, dynamically increment counters, dynamically determine cache related parameters, and/or dynamically update cache related parameters and/or algorithms (such as an insertion and/or eviction algorithm, dynamically updated based on the dynamic analysis) (e.g., such as described with respect to memories 302, 304, and 306; operations 630-637, 650-657, 670-680, path 690, and/or path 695). Moreover, the application (e.g., part of an operating system) may include instructions to create a virtual cache memory defined by tags to data blocks evicted from a buffer cache memory or a victim cache memory as described herein. Specifically, the application may include instructions to create, update, insert, evict, and determine whether a look-up is successful or unsuccessful (e.g., such as described with respect to tags 350, memory 306, portion P1, blocks 362, portion P2, blocks 364, portion P3, blocks 366, operation 480, operation 490, operation 495, operation 665, operation 670, operation 675, operation 677, operation 680, path 690, and/or path 695).

According to some embodiments of the invention, the application or instructions to perform functions described above for FIGS. 1-7 (e.g., such as to create and maintain a virtual cache; and/or perform dynamic analysis, counter increments, determination of cache related parameters, and/or updates of cache related parameters) may have a data size that is a substantially small portion of a total data size of an operating system (e.g., that is a small portion of the operating system application instructions), a main memory (e.g., memory 220), or system memory. For instance, the application or instructions to perform functions described above for FIGS. 1-7 may be less than one or two percent of the total data size of an operating system (e.g., that is a small portion of the operating system application instructions), a main memory (e.g., memory 220), or system storage memory.

In the foregoing specification, specific embodiments are described. However, various modifications and changes may be made thereto without departing from the broader spirit and scope of embodiments as set forth in the claims. The specification and drawings are, accordingly, to be regarded in an illustrative rather than a restrictive sense.

What is claimed is:

1. A method comprising:
   dynamically analyzing a look-up request from a cache look-up algorithm to look-up a data block tag corresponding to a block of data previously inserted into a cache memory to determine a cache related parameter, wherein the cache related parameter comprises an optimal cache data storage size of the cache memory to store the blocks of data, or an optimal cache data eviction algorithm to evict blocks of data previously inserted into the cache memory from the cache memory and wherein the optimal cache data storage size of the cache memory is identified by a cache data storage size of one of the first portion, and a combination of the first portion and the second portion;
   accessing a block of data corresponding to the tag from a mass storage device; and
   dynamically modifying the cache look-up algorithm based on the cache related parameter, wherein the cache memory comprises a virtual cache memory having a plurality of virtual cache memory portions, blocks of data evicted from a first portion are inserted into a second portion.

2. The method of claim 1, wherein the tag corresponds to a block of data evicted from the cache memory, written over in the cache memory, or no longer stored in the cache memory.

3. The method of claim 1, wherein the tag corresponds to a block of data stored in the cache memory.

4. The method of claim 1, wherein the cache memory comprises one of a buffer cache memory, a victim cache memory, and a virtual cache memory.

5. The method of claim 1, wherein the cache memory comprises a virtual cache memory and the blocks and tags are inserted into the virtual cache memory, and the blocks are not stored in the virtual cache memory.

6. The method of claim 1, wherein dynamically analyzing further comprises:
   updating a plurality of counters associated with the tag when a look-up request for the tag is received;
   dynamically updating a plurality of statistics derived from the counters when the counters are updated; and
   further comprising:
   caching, in the cache memory, a copy of the block of data accessed after updating the plurality of statistics.

7. The method of claim 1, further comprising dynamically analyzing and accessing a plurality of tags corresponding to a plurality of blocks of data previously inserted into the cache memory, wherein each tag uniquely identifies a block.

8. The method of claim 7, wherein dynamically analyzing comprises counting a number of look-up requests for each tag over a period of time.

9. The method of claim 1, wherein dynamically analyzing includes determining a hit/miss ratio comprising a ratio of a number of successful look-up requests, and a number of unsuccessful look-up requests.

10. The method of claim 1, where dynamically analyzing includes counting a number of the tags correspond to a metadata block of data, and counting a number of the tags correspond to a normal data block of data.

11. The method of claim 1, wherein the cache memory is a virtual cache memory having a total data storage size, and dynamically analyzing comprises determining a percentage of the total data storage size defined by a sum of data sizes of blocks corresponding to the tags.

12. The method of claim 1, wherein dynamically analyzing comprises determining a working set size comprising a percentage of the number of tags looked up at least once by the operating system.

13. A method comprising:
   dynamically analyzing a look-up request from a cache look-up algorithm to look-up a data block tag corresponding to a block of data previously inserted into a cache memory to determine a cache related parameter;
   accessing a block of data corresponding to the tag from a mass storage device; and
   dynamically modifying the cache look-up algorithm based on the cache related parameter,
   wherein the cache memory comprises a virtual cache memory having a plurality of virtual cache memory portions, blocks of data evicted from a first portion are inserted into a second portion; and
   wherein said dynamically analyzing comprises analyzing look-up requests to look-up a first data block tag corresponding to a first blocks of data previously inserted into the first portion, and analyzing a look-up request to look-up a second data block tag corresponding to a second block of data previously inserted into the first and second portions.

14. The method of claim 13, wherein the tag corresponds to a block of data evicted from the cache memory, written over in the cache memory, or no longer stored in the cache memory.

15. The method of claim 13, wherein the cache memory comprises a virtual cache memory and the blocks and tags are inserted into the virtual cache memory, and the blocks are not stored in the virtual cache memory.

16. The method of claim 13, wherein dynamically analyzing further comprises:
    updating a plurality of counters associated with the tag when a look-up request for the tag is received;
    dynamically updating a plurality of statistics derived from the counters when the counters are updated; and
    further comprising:
    caching, in the cache memory, a copy of the block of data accessed after updating the plurality of statistics.

17. The method of claim 13, further comprising dynamically analyzing and accessing a plurality of tags corresponding to a plurality of blocks of data previously inserted into the cache memory, wherein each tag uniquely identifies a block.

18. The method of claim 17, wherein dynamically analyzing comprises counting a number of look-up requests for each tag over a period of time.

19. The method of claim 13, wherein the cache related parameter comprises an optimal cache data storage size of the cache memory to store the blocks of data, or an optimal cache data eviction algorithm to evict blocks of data previously inserted into the cache memory from the cache memory.

20. The method of claim 19, wherein an optimal cache data storage size of the cache memory is identified by a cache data storage size of one of the first portion, and a combination of the first portion and the second portion.

* * * * *